US008138469B2

(12) United States Patent  
Dittmer

(10) Patent No.: US 8,138,469 B2  
(45) Date of Patent: Mar. 20, 2012

(54) UNIVERSAL PROJECTOR INTERFACE HAVING AT LEAST ONE ARM ASSEMBLY INCLUDING AN ELONGATE ARM MEMBER AND A SHIFTABLE COUPLING PORTION WITH SUSTAINABLE ALIGNMENT

(75) Inventor: Jay Dittmer, Prior Lake, MN (US)

(73) Assignee: Milestone AV Technologies LLC, Savage, MN (US)

( * ) Notice: Subject to any disclaimer, the term of this patent is extended or adjusted under 35 U.S.C. 154(b) by 261 days.

(21) Appl. No.: 12/483,905

(22) Filed: Jun. 12, 2009

(65) Prior Publication Data

US 2009/0316118 A1    Dec. 24, 2009

Related U.S. Application Data

(60) Provisional application No. 61/060,968, filed on Jun. 12, 2008.

(51) Int. Cl.  
*H01J 5/02* (2006.01)

(52) U.S. Cl. .......................................... 250/239; 250/221

(58) Field of Classification Search .................. 250/239, 250/221, 208.1; 248/324, 343, 326, 329, 248/317; 353/119, 72  
See application file for complete search history.

(56) References Cited

U.S. PATENT DOCUMENTS

| 958,644 | A | 5/1910 | Huff |
|---|---|---|---|
| 1,155,383 | A | 10/1915 | Fischer |
| 1,568,758 | A | 1/1926 | Malcolm |
| 4,080,629 | A | 3/1978 | Hammond et al. |
| 4,225,881 | A | 9/1980 | Tovi |
| 4,621,786 | A | 11/1986 | Greenlee |
| 4,645,320 | A | 2/1987 | Muelling et al. |
| 4,709,897 | A | 12/1987 | Mooney |
| 4,771,273 | A | 9/1988 | Test et al. |
| 4,964,606 | A | 10/1990 | Beam et al. |
| 4,967,508 | A | 11/1990 | Reynolds |
| 4,993,676 | A | 2/1991 | Fitts et al. |
| 5,009,384 | A | 4/1991 | Gerke et al. |
| 5,169,114 | A | 12/1992 | O'Neill |
| 5,383,641 | A | 1/1995 | Bergetz |
| 5,490,655 | A | 2/1996 | Bates |
| 5,551,658 | A | 9/1996 | Dittmer |

(Continued)

FOREIGN PATENT DOCUMENTS

DE    2001 7972 U1    1/2001

(Continued)

OTHER PUBLICATIONS

PCT Search Report and Written Opinion Dated Dec. 23, 2010, Cited in International Application No. PCT/US2009/047232, 2 Pgs.

(Continued)

*Primary Examiner* — Que T Le  
(74) *Attorney, Agent, or Firm* — Patterson Thuente Christensen Pedersen, P.A.

(57) ABSTRACT

A universal projector interface including a mount interface portion with a plurality of elongate arm assemblies coupled thereto. Each arm assembly is selectively rotatable and translatable relative to the mount interface, and includes a coupling portion. The coupling portion of each arm assembly is selectively shiftable between a first position in which the coupling portion is securely engaged with a projector attachment member on the projector and a second position in which the coupling portion is freely disengageable from the projector attachment member.

21 Claims, 49 Drawing Sheets

U.S. PATENT DOCUMENTS

| | | | |
|---|---|---|---|
| 5,621,846 A | 4/1997 | Smith et al. | |
| 5,730,410 A | 3/1998 | Archamboult et al. | |
| 5,833,189 A | 11/1998 | Rossman et al. | |
| 5,938,161 A | 8/1999 | Takeuchi et al. | |
| 5,944,896 A | 8/1999 | Landesman et al. | |
| 5,946,404 A | 8/1999 | Bakshi et al. | |
| 6,042,068 A | 3/2000 | Tcherny | |
| 6,341,927 B2 | 1/2002 | Hampson et al. | |
| 6,425,697 B1 | 7/2002 | Potts et al. | |
| 6,527,238 B2 | 3/2003 | Shental et al. | |
| 6,595,379 B1 | 7/2003 | Powell | |
| 6,606,887 B1 | 8/2003 | Zimmer et al. | |
| 6,619,161 B1 | 9/2003 | Blair | |
| 6,708,940 B2 | 3/2004 | Ligertwood | |
| D504,305 S | 4/2005 | Gillespis et al. | |
| 6,883,920 B2 | 4/2005 | Chen | |
| D513,470 S | 1/2006 | Gillespis et al. | |
| 6,986,491 B2 | 1/2006 | Anderson | |
| D514,612 S | 2/2006 | Boele | |
| 7,028,961 B1 | 4/2006 | Dittmer et al. | |
| 7,156,359 B2 | 1/2007 | Dittmer et al. | |
| D540,367 S | 4/2007 | Dittmer | |
| D546,366 S | 7/2007 | Dittmer | |
| D560,669 S | 1/2008 | Muday et al. | |
| 7,317,611 B2 | 1/2008 | Dittmer et al. | |
| 7,503,536 B2 | 3/2009 | Friederick et al. | |
| 7,942,375 B2 * | 5/2011 | Dozier et al. | 248/324 |
| 2004/0080665 A1 | 4/2004 | Lovell | |
| 2004/0211872 A1 | 10/2004 | Dittmer et al. | |
| 2005/0127260 A1 | 6/2005 | Dittmer et al. | |
| 2005/0161575 A1 | 7/2005 | Friederich et al. | |
| 2006/0039128 A1 | 2/2006 | Chiu et al. | |
| 2006/0186301 A1 | 8/2006 | Duzier et al. | |
| 2006/0291152 A1 | 12/2006 | Bremmon | |
| 2007/0034764 A1 | 2/2007 | Dittmer et al. | |
| 2007/0120030 A1 | 5/2007 | Dittmer | |
| 2007/0132655 A1 | 6/2007 | Lin | |
| 2007/0257178 A1 | 11/2007 | Dittmer et al. | |

FOREIGN PATENT DOCUMENTS

| | | |
|---|---|---|
| JP | H03 074408 | 7/1991 |
| JP | H05 069810 | 9/1993 |
| JP | 2000 122180 | 4/2000 |
| JP | 2003 079293 | 8/2001 |
| TW | 240054 B | 9/2005 |

OTHER PUBLICATIONS

Chief Manufacturing Inc. Presentation Support Solutions; RPA Series Projector Mount with All-Points™ Security System; (2004) 4 pages.

Chief Manufacturing Inc.; Full-Line Product Guide 2003, The Focus-Presentation Support Solutions, Jan. 2003; 10 pages.

Peerless; Installation and Assembly—Solid-Point™ Articulating Swivel Arm for 32" to 50" Plasma Screens; Issued: Jun. 7, 2002; Sheet No. 200-9378-14 (Dec. 28, 2005). www.peerlessmounts.com. (16 pages).

Peerless PRS Series Projector Mounts brochure; Models: PRS-UNV, PRS-UNV-S, PRS-UNV-W Issued: Jan. 26, 2004; Sheet No. 055-9821-3, 2 pages.

European Search Report of International Application No. PCT/US2009/047232, dated Nov. 9, 2009, with Written Opinion, 11 pages.

\* cited by examiner

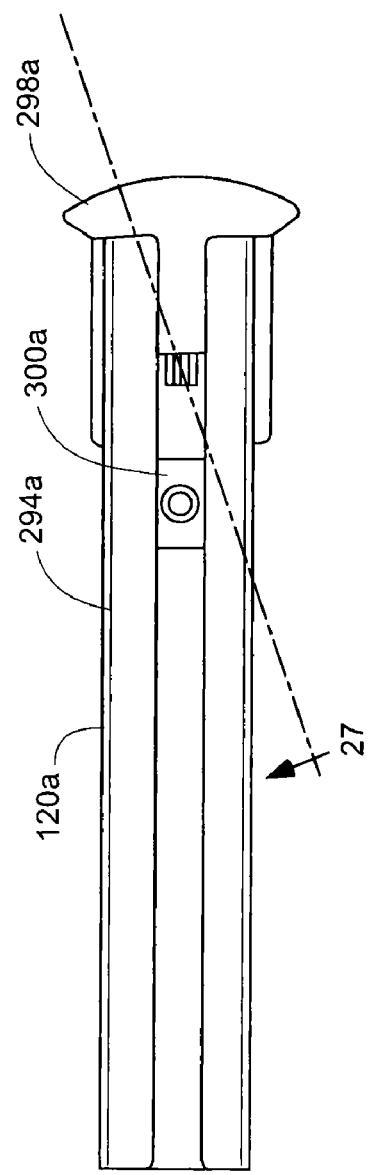

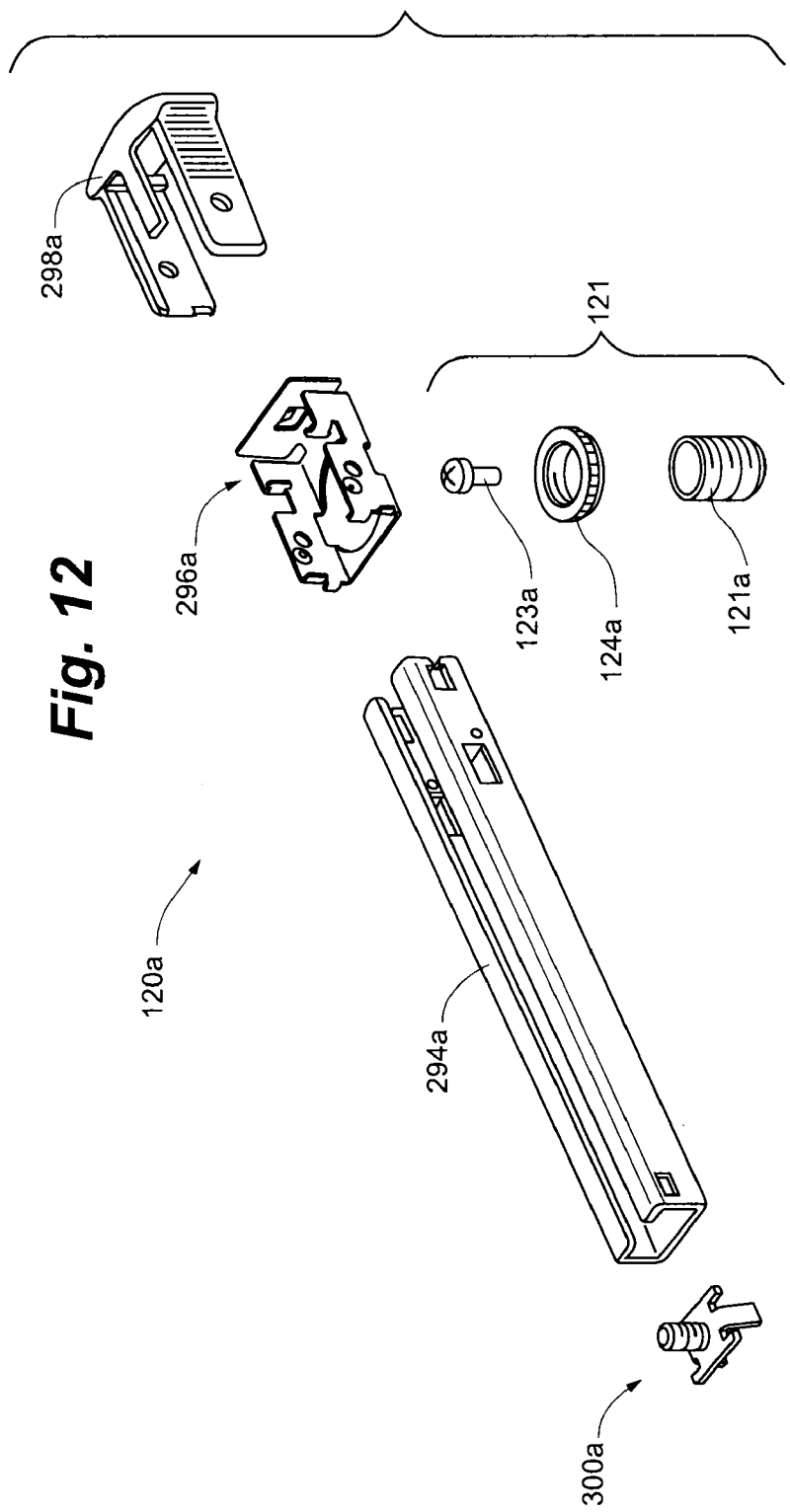

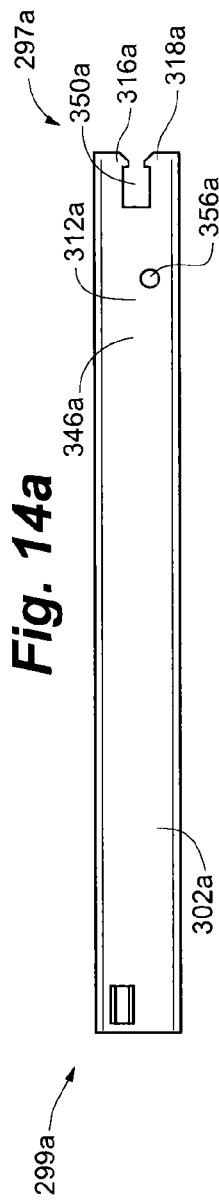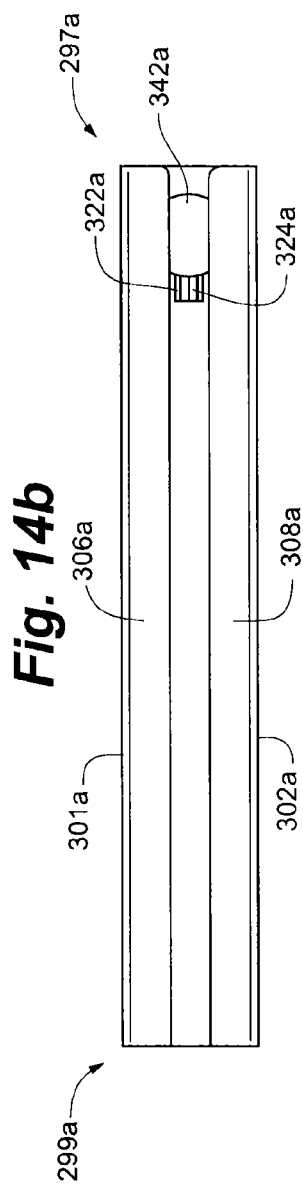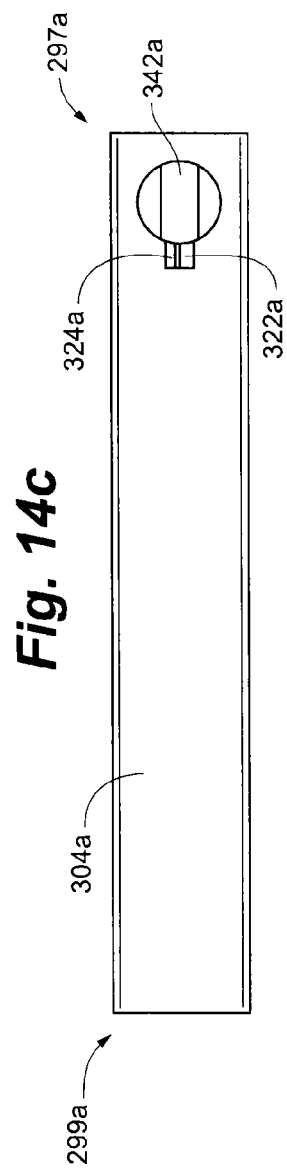

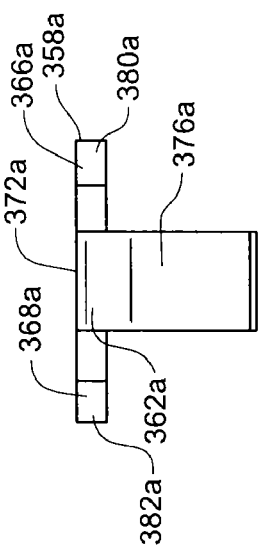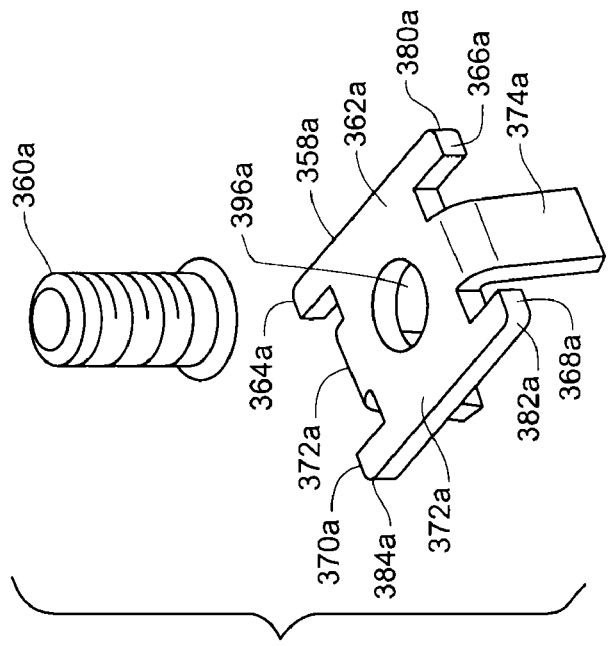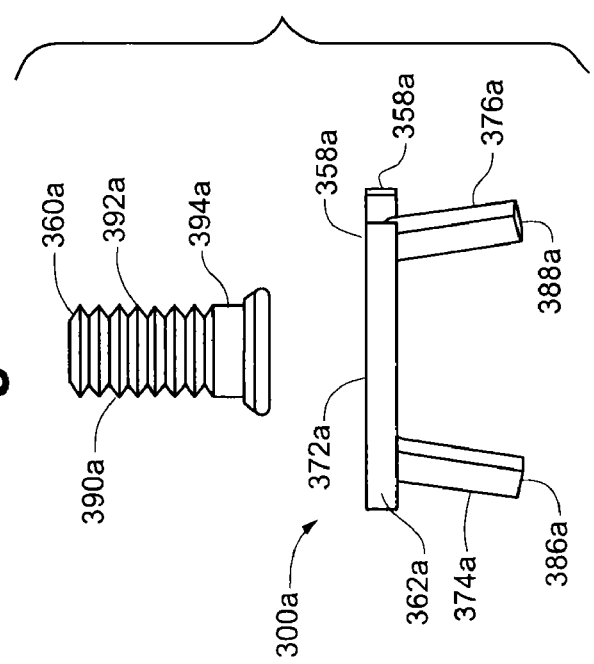

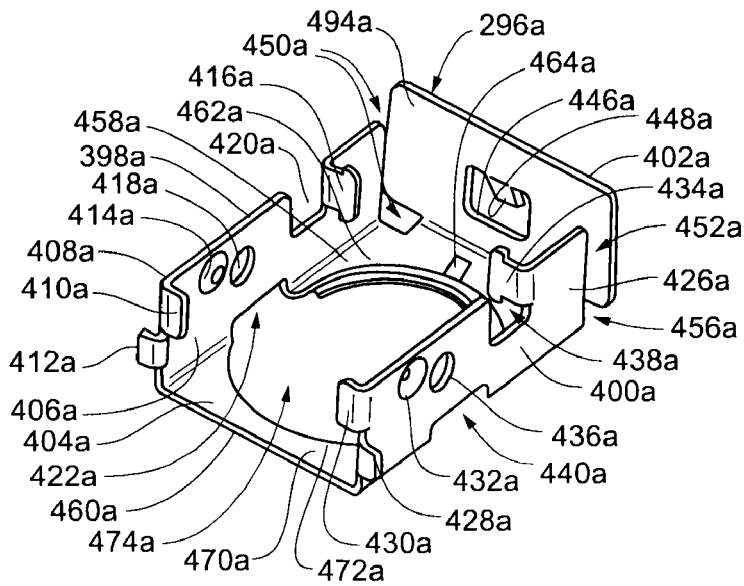
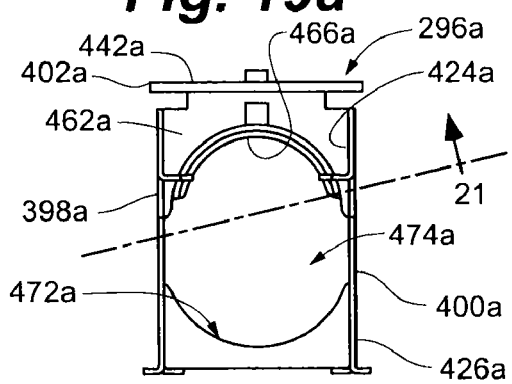
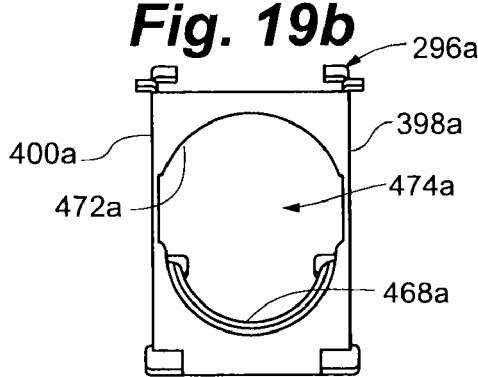

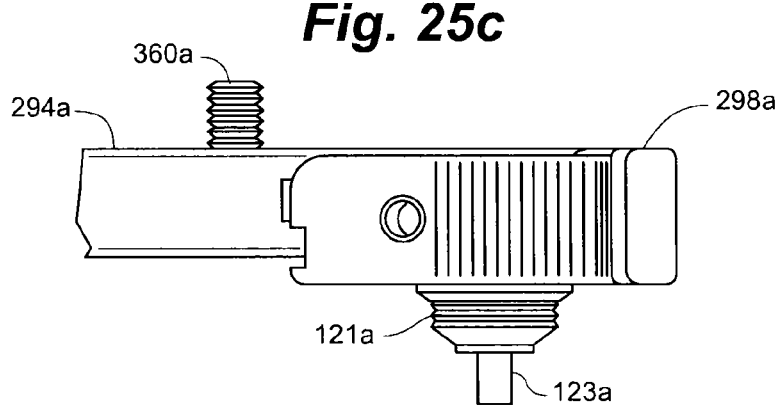

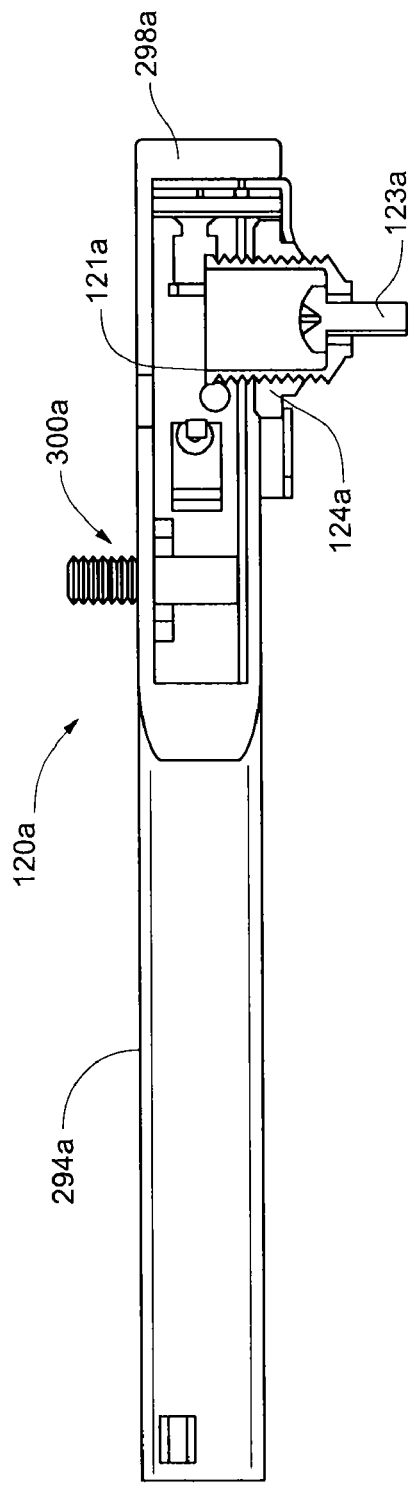

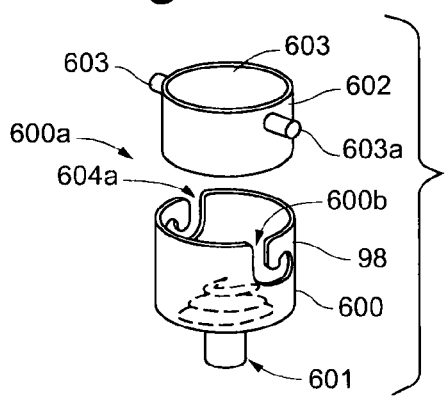
Fig. 29a
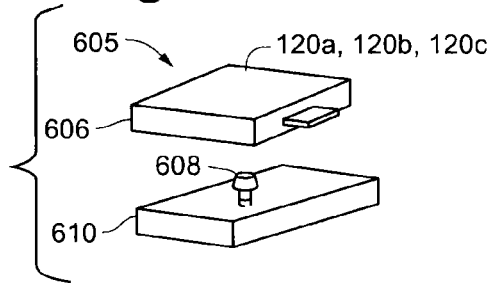
Fig. 29b1
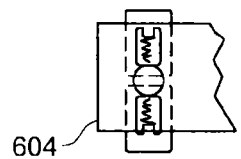
Fig. 29b2
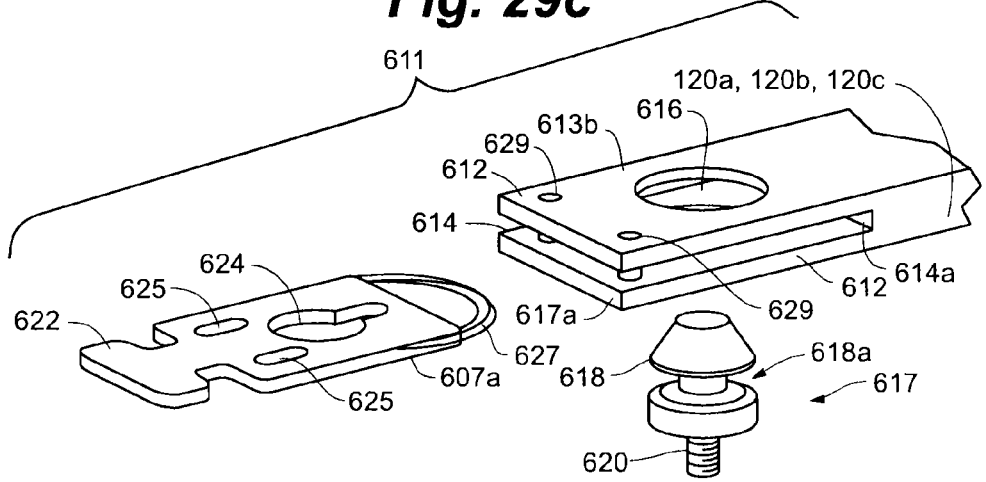
Fig. 29c
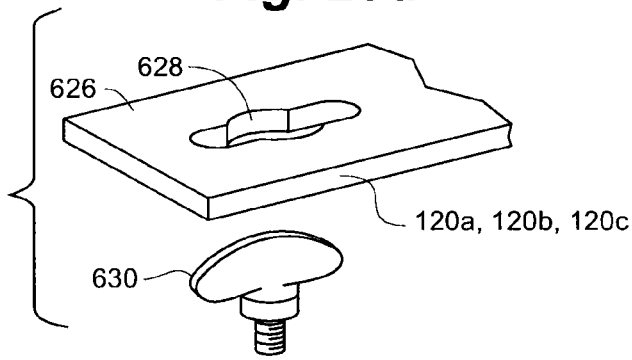
Fig. 29d

UNIVERSAL PROJECTOR INTERFACE HAVING AT LEAST ONE ARM ASSEMBLY INCLUDING AN ELONGATE ARM MEMBER AND A SHIFTABLE COUPLING PORTION WITH SUSTAINABLE ALIGNMENT

RELATED APPLICATIONS

This application claims the benefit of U.S. Provisional Application No. 61/060,968, filed Jun. 12, 2008, and entitled UNIVERSAL PROJECTOR INTERFACE WITH SUSTAINABLE ALIGNMENT, said application being hereby fully incorporated herein by reference.

FIELD OF THE INVENTION

The present invention relates generally to mounting devices and more specifically to universal adjustable mounting devices for projectors.

BACKGROUND OF THE INVENTION

Multi-media presentations performed with video projection equipment have become very common for business and entertainment purposes. Often, the video projection equipment is a portable LCD projector that is placed on a table, cart, or stand in the room, with the image projected on a portion of the wall or a portable screen. Such impromptu arrangements, however, have a number of drawbacks. First, a considerable amount of time is often needed to position, aim, and focus the projector in advance of the presentation—time that is expended repeatedly whenever a different projector is set up. Further, it is often difficult to position a portable projector where it is not in the way of persons moving about in the room, or in the line of sight for those viewing the presentation. Moreover, the wires and cables used to connect the projector with the computer are in the open at ground level, presenting a tripping hazard and an opportunity for damage to the projector if someone comes in contact with them.

In view of these many drawbacks of portable projectors, mounting devices have been developed to enable mounting of a projection device from the ceiling of a presentation room. Such devices have generally been successful in alleviating some of the problems associated with a projector at ground level having exposed wires. These prior ceiling mounting devices have presented certain drawbacks, however.

In U.S. Pat. No. 5,490,655, a device for mounting a video/data projector from a ceiling or wall is disclosed in which struts are used to form channels for supporting the projector and to concealing cabling. The channels, however, result in a rather bulky device that may be difficult to harmonize with the aesthetic environment of a presentation room. In addition, adjustment of the projector for roll, pitch, and yaw may be time consuming and difficult due to the generally limited adjustment capability of the device. Also, the projector may be vulnerable to theft by anyone with common hand tools and access to the device during unattended hours. Other prior devices such as the low-profile LCD projector mount is disclosed in U.S. Pat. No. 6,042,068, offer a relatively more compact mount arrangement, but still offer only a limited range of projector pitch and yaw adjustment, and no roll adjustment at all.

A projector mount is described in U.S. Pat. No. 7,156,359, which alleviates many of the problems of prior devices. U.S. Pat. No. 7,156,359 is owned by the owners of the present invention and is hereby fully incorporated herein by reference. The disclosed mount provides independent projector roll, pitch, and yaw adjustments along with theft deterrence in the form of coded fasteners connecting each separate portion of the mount. Fine adjustment for position may be hampered, however, due to the number of separate fasteners to be loosened and tightened to enable adjustment (six for the pitch and roll adjustments), and by the tendency for the weight of the projector to pull the mount out of adjustment unless the projector is held in the desired position. Also, although the theft resistant security fasteners inhibit theft of the device, convenience of use of the projector device is compromised by the need to remove the security fasteners with a special tool in order to move the projector to a new location.

A further improvement of this projector mount is described in U.S. Pat. No. 7,497,412, hereby fully incorporated herein by reference. The projector mount described therein enables easy micro-adjustment of projector aim in roll, pitch, and yaw, and also enable quick disconnect of the projector from the mount.

A difficulty with all these mounts, however, is that projectors of different makes often employ different mounting-fastener patterns for attaching a mount to the projector. This has required a multiplicity of different projector mount models, each matched to a different projector make.

While universal mount interfaces, such as described in U.S. Pat. No. 7,503,536, hereby fully incorporated herein by reference, have provided a way to attach a projector to a variety of different projector makes, a persistent difficulty, even with such universal mounts, has been that projectors often have serviceable parts, such as filters and bulbs, that are located in the vicinity of the fastener locations for attaching the projector to the mount. When these parts need to be replaced or serviced, the mount must be removed from the projector to obtain access. Because the projector typically cannot be simply reattached in precisely the same position at it was before the mount was removed, the projector typically must be tediously and time-consumingly re-aimed. This re-aiming typically is performed by a professional, causing expense and delay for the projector end-users.

Hence, a need still exists in the industry for a projector mount easily and quickly adaptable to a multiplicity of different projector makes and that enables easy serviceability of the projector by end-users.

SUMMARY OF THE INVENTION

Embodiments of the present invention address the need for a projector mount easily and quickly adaptable to a multiplicity of different projector makes and that enables easy serviceability of the projector by end-users. According to an embodiment, a universal projector interface includes a mount interface portion with a plurality of elongate arm assemblies coupled thereto. Each arm assembly is selectively rotatable and translatable relative to the mount interface, and includes a coupling portion. The coupling portion of each arm assembly is selectively shiftable between a first position in which the coupling portion is securely engaged with a projector attachment member on the projector and a second position in which the coupling portion is freely disengageable from the projector attachment member.

The mount interface portion can be coupled with a projector mount that is in turn coupled with an element of a structure such as a ceiling. Each arm assembly can be rotated and translated so the coupling portion is positioned to be engagable with a separate projector attachment member on the projector. The projector can then be coupled to the universal projector interface and projector mount by engaging each projector attachment members with one of the coupling portions of the arm assemblies and shifting the coupling portion from the second position to the first position to secure the arm assembly to the projector. The projector may then be precisely aimed by making adjustments on the projector mount or the universal projector interface. Once the projector has been aimed, the projector can be easily and quickly removed from the projector mount and universal projector interface by shifting each of the coupling portions of the arm assemblies to the second position and removing the projector. Because shifting of the coupling portions does not affect any of the aiming adjustments on the projector mount or universal mount interface, the projector can be quickly and easily reattached with the need for reaiming by simply again engaging each projector attachment member with one of the coupling portions of the arm assemblies and shifting the coupling portion from the second position to the first position to secure the arm assembly to the projector.

According to an embodiment, a universal projector interface includes a mount interface portion adapted to receive a projector mount, at least one projector attachment member adapted to couple with a projector, and at least one arm assembly operably coupled with the mount interface portion so as to be selectively shiftable relative to the mount interface portion. The arm assembly includes a coupling portion selectively shiftable between a first position wherein the coupling portion is engaged with the at least one projector attachment member so as to prevent vertical and horizontal translation of the at least one arm assembly relative to the at least one projector attachment member, and a second position wherein the coupling portion and the at least one arm assembly is freely disengagable from the at least one projector attachment member.

The projector attachment member may be a fastener receivable in a fastener aperture of the projector and a selectively shiftable collar on the fastener, and the coupling portion may be a clip slidably received on an end of the at least one arm assembly. The clip may define a projection, the projection being engaged with the collar of the projector attachment member when the coupling portion is in the first position so as to inhibit threading movement of the collar on the fastener in order to prevent loosening of the engagement between the coupling portion and the projector attachment member.

In further embodiments, the mount interface portion may define a plurality of elongate apertures, and the at least one arm assembly may be coupled to the mount interface portion with a fastener extending through one of the elongate apertures, the fastener selectively shiftable along the elongate aperture to shift a position of the at least one arm assembly relative to the mount interface portion. The at least one arm assembly may include an elongate arm member defining a channel oriented longitudinally along the elongate arm member, the fastener being selectively shiftable along the channel to enable shifting of the position of the at least one arm assembly relative to the mount interface portion.

In further embodiments, the universal projector interface of claim 1, further includes means for locking the coupling portion in the first position. The at least one arm assembly may define a first aperture and the coupling portion may define a second aperture, the first and second apertures being in registration when the coupling portion is in the first position. The means for locking may be a locking member insertable through the first aperture and the second aperture when the coupling portion is in the first position.

In further embodiments, a visual display system includes a projector, a projector mount, and a universal mount interface operably coupling the projector and the projector mount. The universal mount interface includes a mount interface portion operably coupled with the projector mount, at least one projector attachment member coupled with the projector, and at least one arm assembly operably coupled with the mount interface portion so as to be selectively shiftable relative to the mount interface portion. The arm assembly includes a coupling portion selectively shiftable between a first position wherein the coupling portion is engaged with the at least one projector attachment member so as to prevent vertical and horizontal translation of the at least one arm assembly relative to the at least one projector attachment member, and a second position wherein the coupling portion and the at least one arm assembly is freely disengagable from the at least one projector attachment member.

The projector attachment member may include a fastener receivable in a fastener aperture of the projector and a collar threaded on the fastener, and the coupling portion may include a clip slidably received on an end of the at least one arm assembly. The clip may define a projection, the projection being engaged with the collar of the projector attachment member when the coupling portion is in the first position so as to inhibit threading movement of the collar on the fastener. The mount interface portion may define a plurality of elongate apertures, and the at least one arm assembly may be coupled to the mount interface portion with a fastener extending through one of the elongate apertures, the fastener selectively shiftable along the elongate aperture to shift a position of the at least one arm assembly relative to the mount interface portion. Further, the at least one arm assembly may include an elongate arm member defining a channel oriented longitudinally along the elongate arm member, the fastener being selectively shiftable along the channel to enable shifting of the position of the at least one arm assembly relative to the mount interface portion.

In further embodiments, a method of installing a projector may include providing a universal projector interface with a mount interface portion adapted to receive a projector mount thereon, at least one projector attachment member adapted to couple with a projector, and at least one arm assembly operably coupled with the mount interface portion so as to be selectively shiftable relative to the mount interface portion. The arm assembly includes a coupling portion selectively shiftable between a first position wherein the coupling portion is engaged with the at least one projector attachment member so as to prevent vertical and horizontal translation of the at least one arm assembly relative to the at least one projector attachment member, and a second position wherein the coupling portion and the at least one arm assembly is freely disengagable from the at least one projector attachment member. The method further includes providing instructions with the universal projector interface instructing a user to couple the at least one projector attachment member with the projector, couple the mount interface portion with the projector mount, and couple the projector with the projector mount by shifting the coupling portion of the arm assembly to the second position, engaging the coupling portion with the projector attachment member, and shifting the coupling portion to the first position.

In still further embodiments, a visual display system includes a projector, a projector mount, and a universal mount interface operably coupling the projector and the projector mount. The universal mount interface includes a mount interface portion operably coupled with the projector mount, a plurality of projector attachment members coupled with the projector, and a plurality of arm assemblies operably coupled with the mount interface portion so as to be selectively shiftable relative to the mount interface portion. Each arm assembly includes a coupling portion selectively shiftable between a first position wherein the coupling portion is engaged with one of the projector attachment members so as to prevent vertical and horizontal translation of the arm assembly relative to the projector attachment member to which the arm assembly is attached, and a second position wherein the coupling portion and the arm assembly are freely disengagable from the projector attachment member.

Each projector attachment member may include a fastener receivable in a fastener aperture of the projector and a collar threaded on the fastener, and each coupling portion comprises a clip slidably received on an end of the arm assembly. The mount interface portion may define a plurality of elongate apertures, and each arm assembly may be coupled to the mount interface portion with a fastener extending through a separate one of the elongate apertures, the fastener selectively shiftable along the elongate aperture to shift a position of the arm assembly relative to the mount interface portion. Each arm assembly may include an elongate arm member defining a channel oriented longitudinally along the elongate arm member, the fastener being selectively shiftable along the channel to enable shifting of the position of the arm assembly relative to the mount interface portion.

BRIEF DESCRIPTION OF THE DRAWINGS

The invention may be more completely understood in consideration of the following detailed description of various embodiments of the invention in connection with the following drawings, in which:

FIG. 11b is a top plan view of the track assembly of FIG. 11a;

FIG. 12 is an exploded perspective view of the track assembly of FIG. 11a;

FIG. 14a is a side elevation view of the track bar of FIG. 13;

FIG. 14b is a top plan view of the track bar of FIG. 13;

FIG. 14c is a bottom plan view of the track bar of FIG. 13;

FIG. 15b is a rear perspective view of the track bar of FIG. 15a;

FIG. 15c is a rear elevation view of the track bar of FIG. 15a;

FIG. 17a is an exploded front elevation view of the slide assembly of FIG. 12;

FIG. 17b is an exploded perspective view of the slide assembly of FIG. 17a;

FIG. 17c is a side elevation view of the slide bridge of FIG. 17a;

FIG. 18 is a perspective cross-sectional view taken at section 14 of FIG. 11a;

FIG. 19 is a perspective view of the engagement bracket of FIG. 12;

FIG. 19a is a top plan view of the engagement bracket of FIG. 19;

FIG. 19b is a bottom plan view of the engagement bracket of FIG. 19;

FIG. 20 is a perspective cross-sectional view taken at section 21 of FIG. 19a;

FIG. 21b is a fragmentary side elevation view of the track bar and the engagement bracket of FIG. 21a;

FIG. 21c is a fragmentary top plan view of the track bar and the engagement bracket of FIG. 21a;

FIG. 21d is a fragmentary bottom plan view of the track bar and the engagement bracket of FIG. 21a;

FIG. 22b is a top plan view of the pull cover of FIG. 22a;

FIG. 22c is a side elevation view of the pull cover of FIG. 22a;

FIG. 22d is a rear elevation view of the pull cover of FIG. 22a;

FIG. 23b is a side elevation view of the engagement fastener and engagement collar of FIG. 23a;

FIG. 24b is rear perspective view of the track bar with engagement collar and fastener of FIG. 24a;

FIG. 25b is a side view of the track bar with engagement bracket, collar and fastener of FIG. 25a;

FIG. 25c is a side view of the track bar with engagement bracket, collar and fastener of FIG. 25a with pull cover;

FIG. 26b is a side view of engagement bracket with collar and ring of FIG. 26a;

FIG. 26c is another side view of engagement bracket with collar and ring of FIG. 26a;

FIG. 26d is a top view of engagement bracket with collar and ring of FIG. 26a;

FIG. 26e is a perspective cross-sectional view of engagement bracket with collar and ring of FIG. 26a;

FIG. 26f is a perspective cross-sectional view of engagement bracket with collar and ring of FIG. 26a;

FIG. 27 is a perspective cross-sectional view of track assembly 120a according to an embodiment of the invention;

FIG. 29a is a perspective view of a rotating latching mechanism of a projector interface according to an embodiment of the invention;

FIG. 29b1 is a perspective view of a watch-band clasp mechanism of a projector interface according to an embodiment of the invention;

FIG. 29b2 is a partial cross-section of the watch-band clasp mechanism of FIG. 29b1;

FIG. 29c is a perspective view of a beveled pin locking mechanism of a projector interface according to an embodiment of the invention;

FIG. 29d is a perspective view of a turning key mechanism of a projector interface according to an embodiment of the invention;

FIG. 36b is a side elevation view of the pivoting latch mechanism of FIG. 36a;

Figure 1:
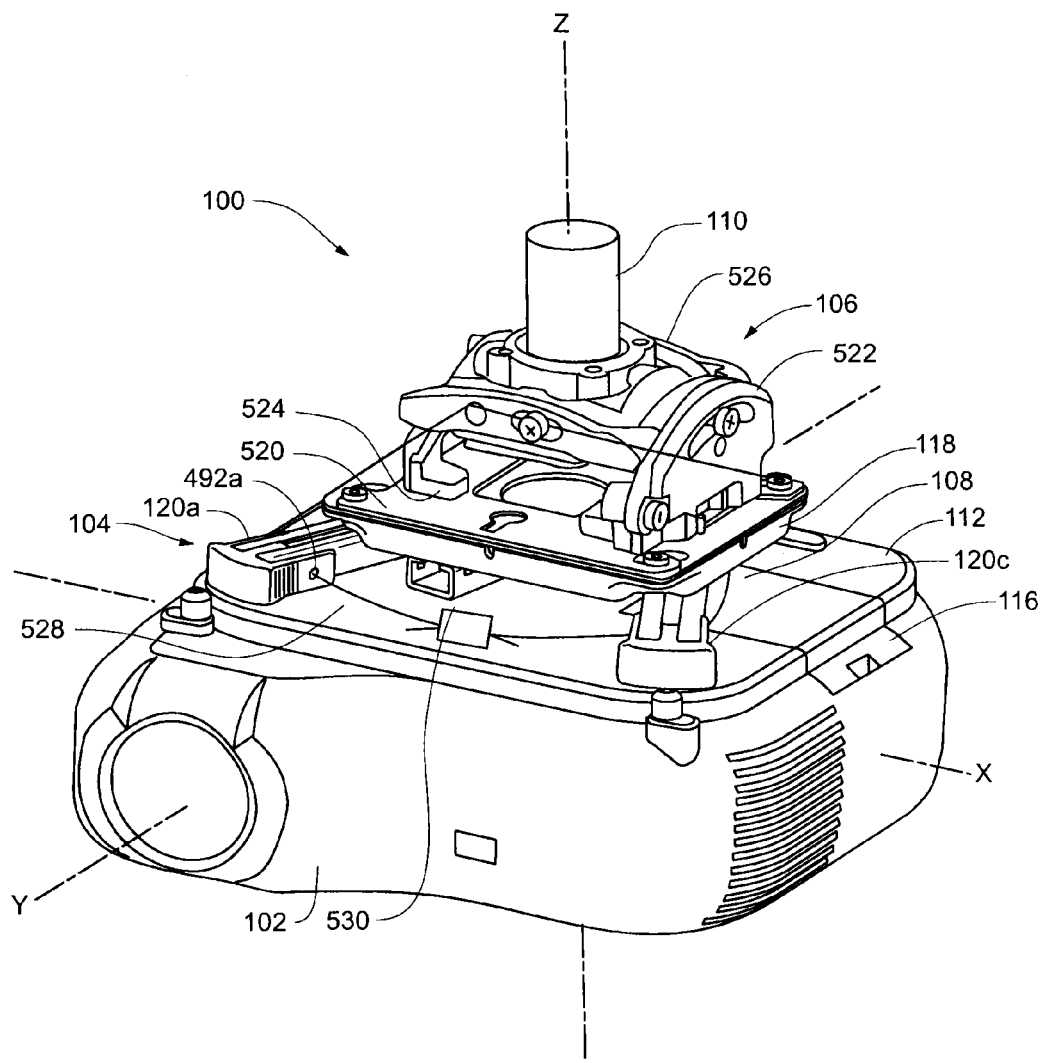
FIG. 1 is a perspective view of a universal projector interface, according to an embodiment of the invention, supporting a projector.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The accompanying Figures depict embodiments of the mount of the present invention, and features and components thereof. Any references to front and back, right and left, top and bottom, upper and lower, and horizontal and vertical are intended for convenience of description, not to limit the present invention or its components to any one positional or spacial orientation. Any dimensions specified in the attached Figures and this specification may vary with a potential design and the intended use of an embodiment of the invention without departing from the scope of the invention. Moreover, the Figures may designate, for reference purposes, the relative directions of x-y-z coordinate axes as applied to the invention. Any reference herein to movement in an x-axis direction, a y-axis direction, or a z-axis direction, or to rotation about an x-axis, a y-axis or a z-axis, relates to these coordinate axes. The y-axis is oriented fore-and-aft in relation to the mounted device, the z-axis is vertical and the x-axis is perpendicular to the z-axis and the y-axis, and is oriented laterally from side-to-side in relation to the mounted device. For the purposes of the present application, pitch is defined as angular displacement about the x-axis, roll is defined as angular displacement about the y-axis, and yaw is defined as angular displacement about the z-axis.

Figure 2:
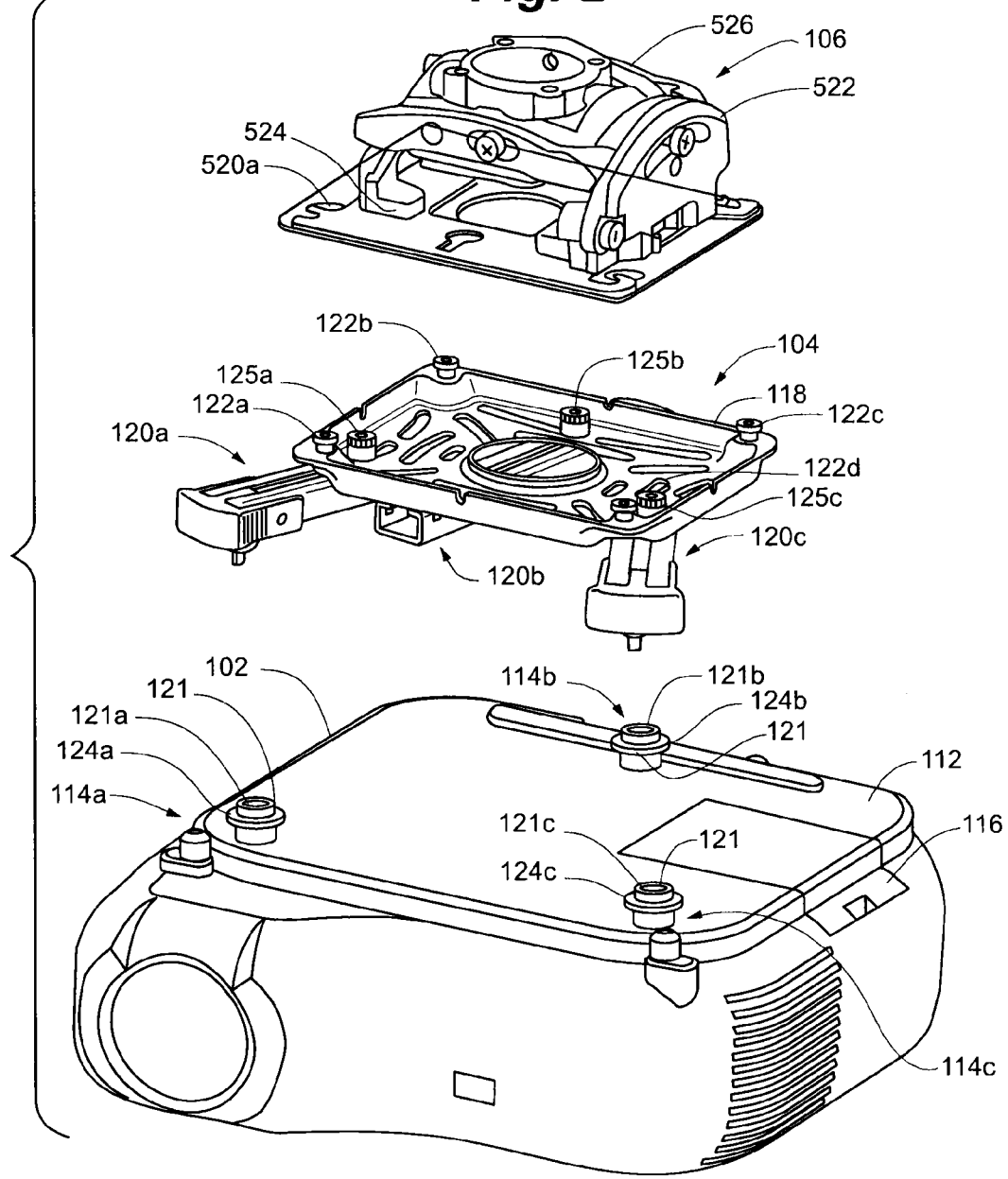
FIG. 2 is an exploded perspective view of the universal projector interface of FIG. 1.

As depicted in FIGS. 1-2, projector mounting system 100 generally includes projector 102, projector interface 104, projector mount 106, optional security cable assembly 108, and pipe support 110. Projector 102 may be any of a number of known projection devices, and generally includes projector mounting surface 112, projector mounting holes 114a, 114b, 114c, and access door 116. The details of projector mount 106 are fully described in U.S. Pat. No. 7,497,412, owned by the owners of the present invention, said patent hereby fully incorporated herein by reference.

As depicted in FIGS. 3-6, projector interface 104 generally includes interface plate 118, track assemblies 120a, 120b, 120c, and projector interface members in the form of engagement fasteners 121. Track assemblies 120a, 120b, 120c are pivotally coupled to interface plate 118 with plate-track fasteners 125a, 125b, 125c, 125d, as will be further described hereinbelow. Engagement fasteners 121 generally include engagement fasteners 121a, 121b, 121c, and engagement collars 124a, 124b, 124c. In the embodiment depicted, projector interface 104 includes three track assemblies 120a, 120b, 120c, but in other embodiments, may include four or more track assemblies depending on available mounting holes 114, and other projector 102 characteristics.

Figure 7:
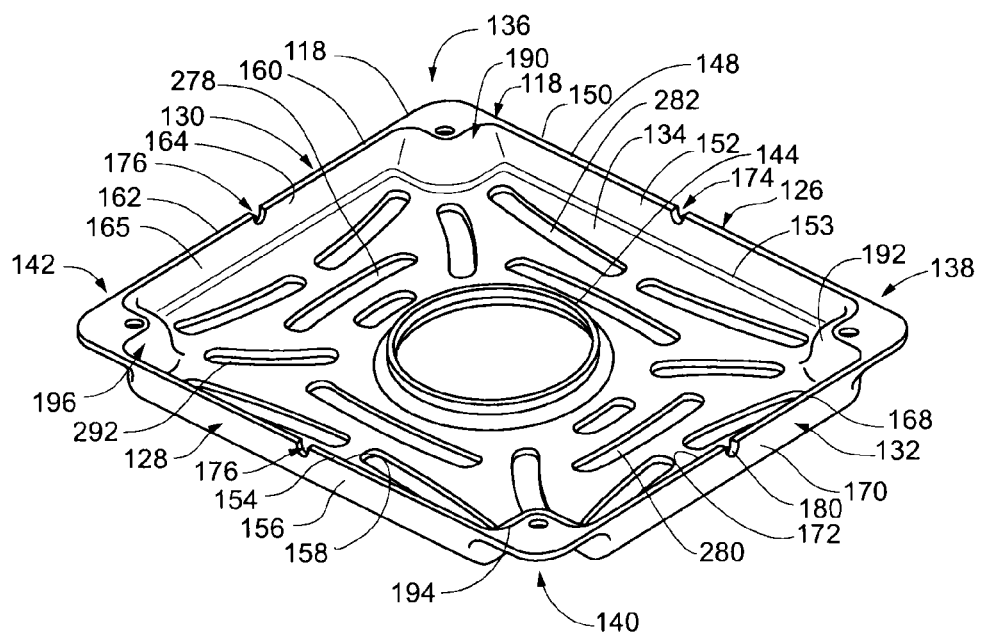
FIG. 7 is a perspective view of the interface plate of FIG. 3.
Figure 8A:
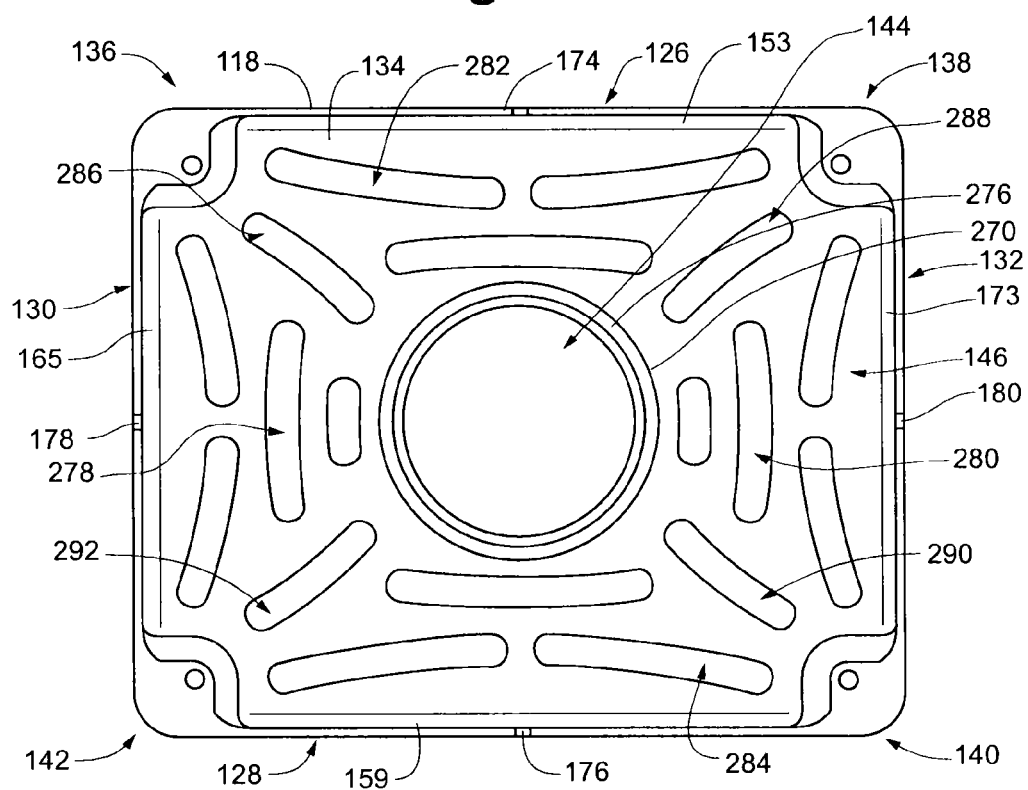
FIG. 8a is a top plan view of the interface plate of FIG. 7.
Figure 8B:
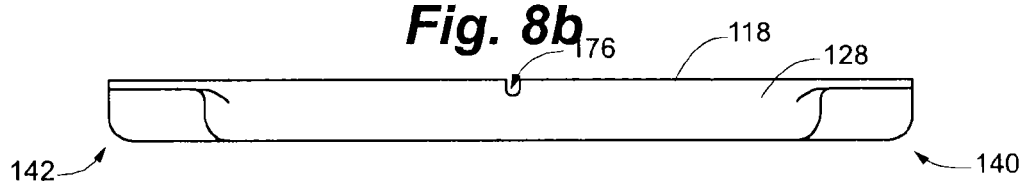
FIG. 8b is a front elevation view of the interface plate of FIG. 7.
Figure 8C:
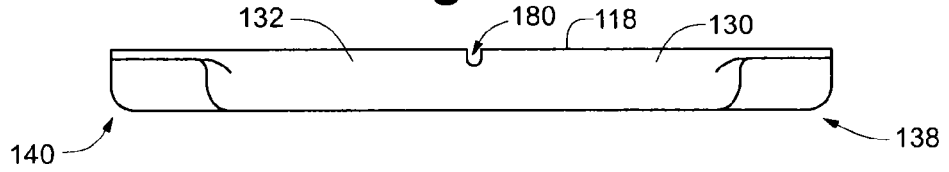
FIG. 8c is a side elevation view of the interface plate of FIG. 7.
Figure 8D:
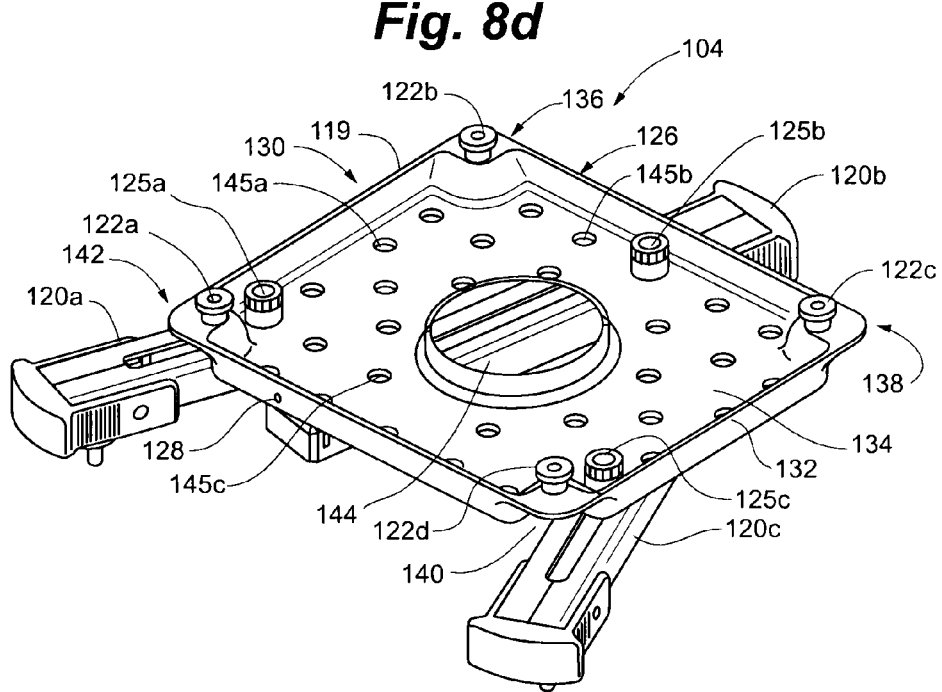
FIG. 8d is a perspective view of an interface plate according to an embodiment of the invention.
Figure 8E:
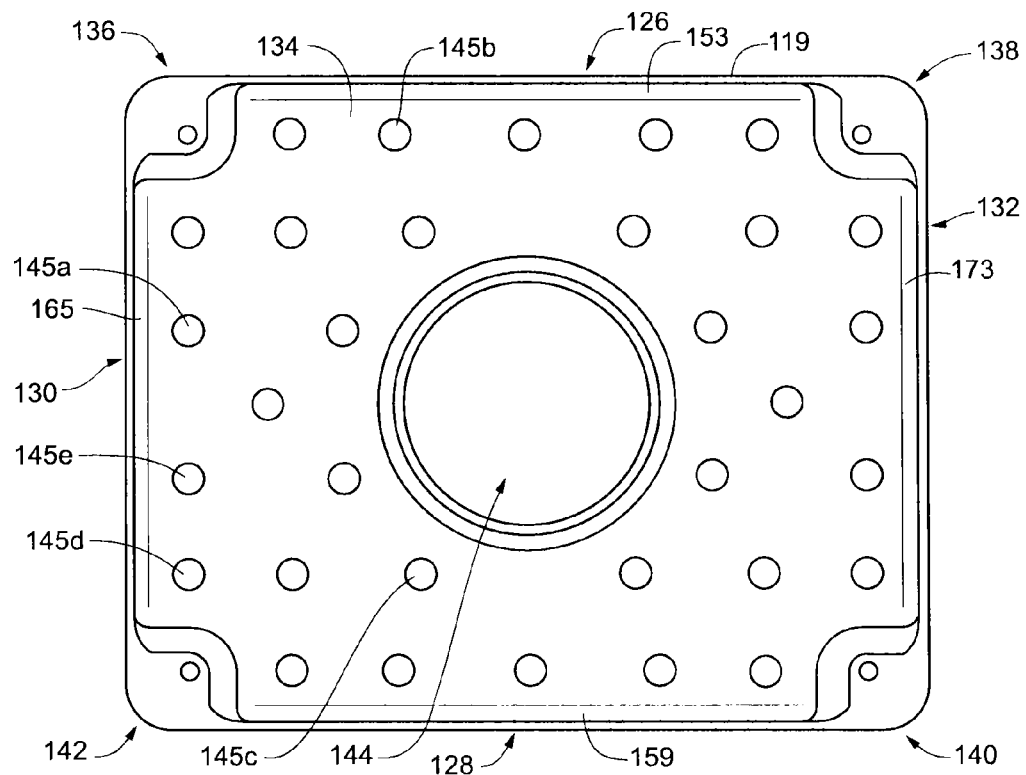
FIG. 8e is a top view of the interface plate of FIG. 8d.
Figure 8F:
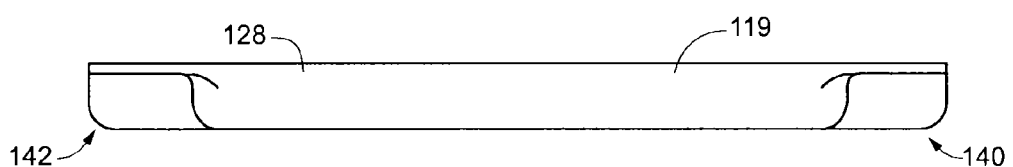
FIG. 8f is a front view of the interface plate of FIG. 8d.
Figure 8G:
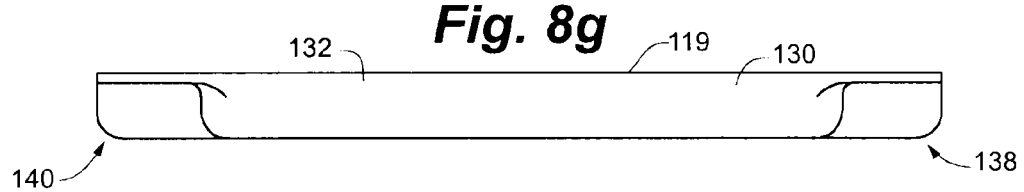
FIG. 8g is a side view of the interface plate of FIG. 8d.
Figure 9:
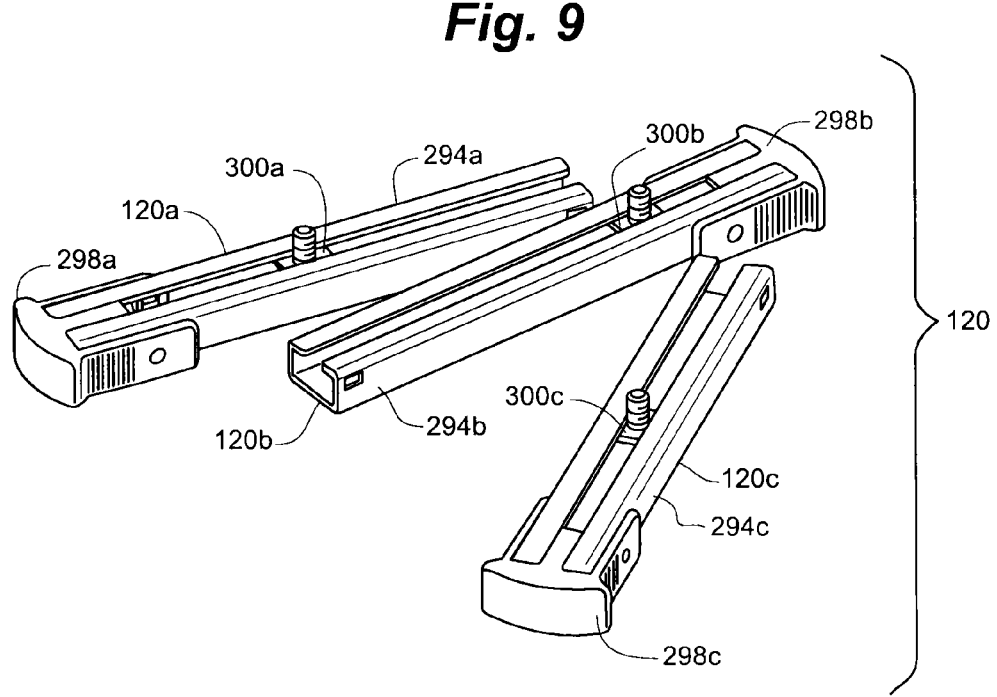
FIG. 9 is a perspective view of the track assemblies of FIG. 3.
Figure 10:
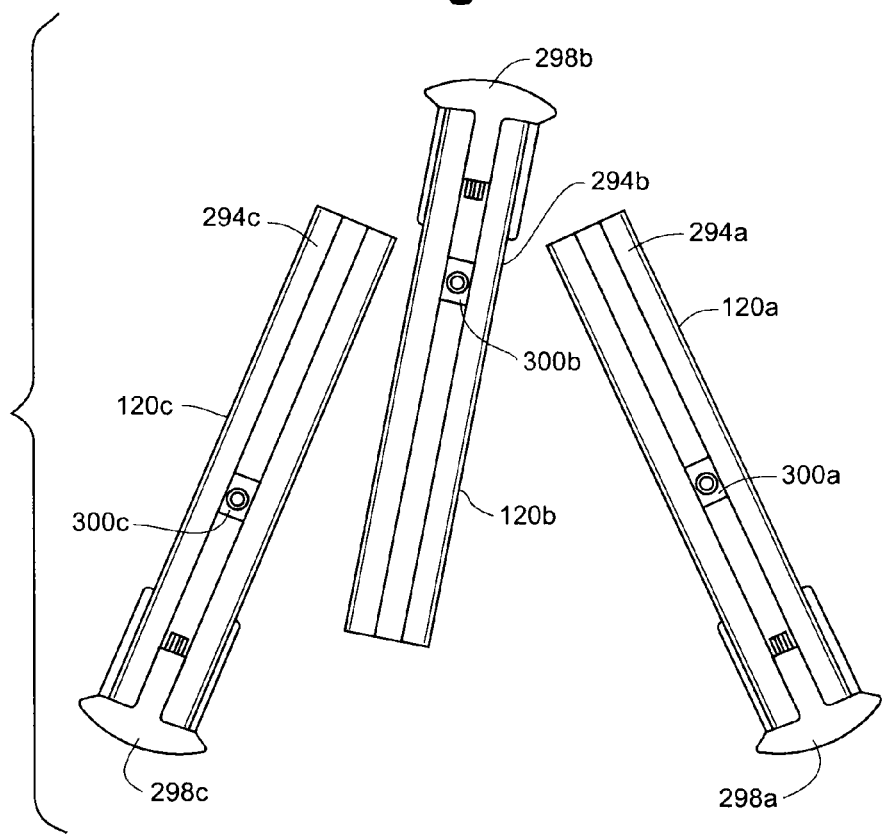
FIG. 10 is a top plan view of the track assemblies of FIG. 9.
Figure 11A:
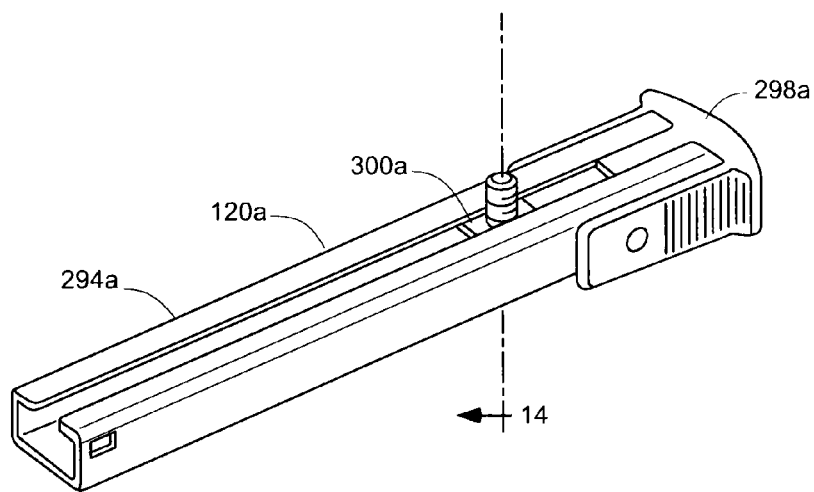
FIG. 11a is a perspective view of one of the track assemblies of a universal projector interface according to an embodiment of the invention.
Figure 13:
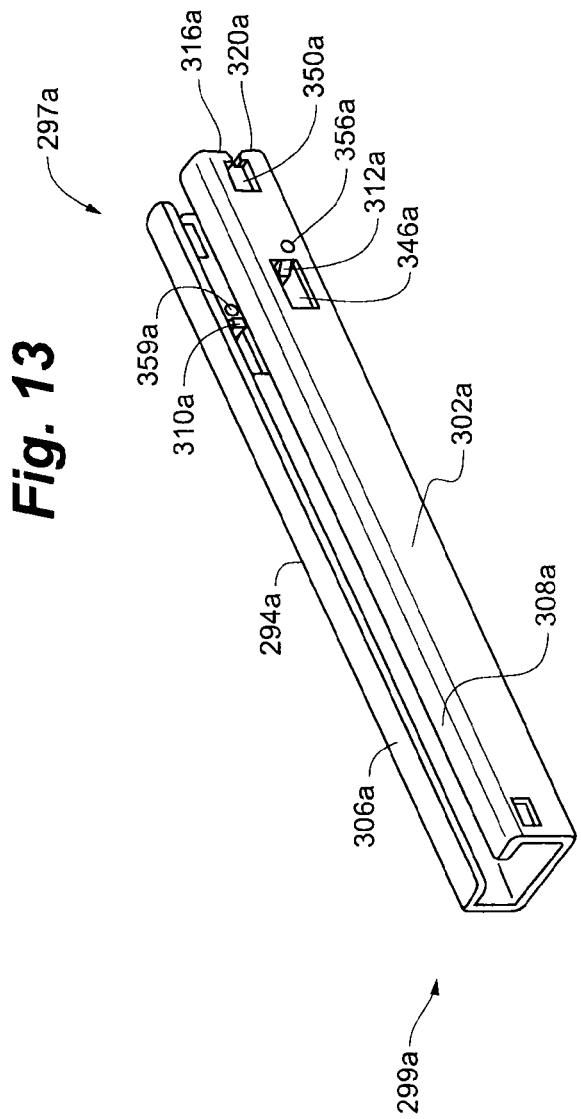
FIG. 13 is a perspective view of the track bar of FIG. 12.

Referring now to FIGS. 7-8, interface plate 118 may be generally rectangular or nearly square in shape, and resembling a shallow tray. Interface plate 118 generally includes two long perimeter walls 126, 128, two short perimeter walls 130, 132, floor 134, raised corners 136, 138, 140, 142. Interface plate 118 further defines a generally central aperture 144 and a series of slots 146. In alternative embodiments, interface plate 118 may include a series of circular holes, a combination of holes and slots, or may generally include openings of other shapes and sizes that are capable of receiving track assemblies 120.

Long wall 126 generally includes a top surface 148, outer surface 150, inner surface 152, transition portion 153, and traverses the width of interface plate 118 along the x-axis between raised corners 136 and 138. Similarly, long wall 128 generally includes a top surface 154, outer surface 156, inner surface 158, transition portion 159, and traverses the width of interface plate 118 between raised corners 140 and 142. The length of wall 126 generally is equal to the length of wall 128.

Short wall 130 generally includes a top surface 160, outer surface 162, inner surface 164, transition portion 165, and traverses the width of interface plate 118 along the x-axis between raised corners 136 and 142. Similarly, short wall 132 generally includes a top surface 168, outer surface 170, inner surface 172, transition portion 173, and traverses the width of interface plate 118 between raised corners 140 and 142. The length of wall 130 generally is equal to the length of wall 132.

The heights along the z axis of walls 126, 128, 130, and 132 define the depth of interface plate 118, and in the depicted embodiment are substantially equal. In the embodiment depicted in the figures, the wall height is substantially less than either the length or width of the walls such that walls 126, 128, 130, 132, with floor 134 form a shallow tray. In other embodiments, the height of walls 126, 128, 130, and 132 may vary depending on the characteristics of projector mount 106, whether interface plate will house assembly tools, and so on.

Short walls 130 and 132 traverse the length of interface plate 118 along the y axis, between corners 138 and 140, and 136 and 142, respectively. The height of short walls 130 and 132 are generally equal to the height of long walls 126 and 128, such that top surfaces 148, 154, 160, and 168 form a common plane.

In the depicted embodiment, walls 126, 128, 130 and 132 are generally perpendicular to floor 134, but in other embodiments may form other than an acute angle with floor 134. Walls 126, 128, 130, and 132 join with floor 134 via transition portions 153, 159, 165, and 173, respectively. Wall transition portions 153, 159, 165, and 173 are generally curvilinear and join the vertical portions of their respective walls with floor 134.

In one embodiment, walls 126, 128, 130, and 132 may each also define notches 174, 176, 178, and 180, respectively. Each notch 174, 176, 178, 180 is generally semi-circular, and located in a top central portion of each wall such that it bisects its respective top surface 150, 154, 160, 168. Corners 136, 138, 140, and 142 generally include respective tabs 182, 184, 186, 188 and corner walls 190, 192, 194, 196

Tabs 182, 184, 186, 188 generally include respective tab top surfaces 198, 200, 202, 204, tab bottom surfaces 206, 208, 210, 212, outer edges 214, 216, 218, 220, and generally define respective circular tab holes 222, 224, 226, 228. Tab top surfaces 206, 208, 210, 212 are substantially flat and generally lie in the same plane formed by the four wall top surfaces 150, 154, 160, 168. Each tab outer edge 214, 216, 218, 220 forms a rounded corner edge or surface of interface plate 118.

Corner walls 190, 192, 194, 196 include respective top portions 230, 232, 234, 236, middle portions 238, 240, 242, 244, bottom portions 246, 248, 250, 252, inner surfaces 254, 256, 258, 260, and outer surfaces 262, 264, 266, 268.

Top portions 230, 232, 234, 236 extend from their respective tab top surfaces 198, 200, 202, 204 downward to their respective middle portions 238, 240, 242, 244 forming a generally concave structure as viewed from the center of interface plate 118. Tab top surfaces 198, 200, 202, 204 may further form an S-shape or L-shape as viewed along the z axis. The exact curvature and shape of top portions 230, 232, 234, 236 may vary from embodiment to embodiment, but generally will form a concave, curved structure at each corner 136, 138, 140, 142.

Middle portions 238, 240, 242, 244 are located adjacent top portions 230, 232, 234, 236 and bottom portions 246, 248, 250, 252 and may be substantially perpendicular to floor 134. Middle portions 238, 240, 242, 244 may be curvilinear, generally forming a C shape, or L shape as viewed along the z axis.

Bottom portions 246, 248, 250, 252 are located adjacent middle portions 238, 240, 242, 244 and floor 134. Bottom portions 246, 248, 250, 252 may be somewhat convex and generally follow the curvature of their respective middle and top portions.

Central aperture 144 in the depicted embodiment is a circular opening located in the center of interface plate 118. In other embodiments, central aperture 144 may be square, rectangular, or otherwise appropriately shaped to receive pipe support 110. The size of central aperture 144 may vary to accommodate pipe support 110 or to allow for needed ventilation for projector 102. In the depicted embodiment, the diameter of central aperture 144 is approximately 35% of the width of interface plate 118.

Central aperture 144 may be surrounded by raised lip 270. Raised lip 270 rises upward from floor 134 in a vertical direction, and generally includes a top portion 272 and a bottom portion 274. Top portion 272 is generally vertical with a flat top surface 276, while bottom portion 274 may be slightly concave. In other embodiments, bottom portion 274 may be slightly convex. Top surface 276 generally lies in a plane beneath the plane formed by wall top surfaces 150, 154, 160, 168, but in some embodiments may lie in the same plane as that formed by wall top surfaces 150, 154, 160, 168.

Slots 146 defined by floor 134 of interface plate 118 may vary in quantity, shape, and distance from central aperture 144, but are generally arcuate in shape with a length longer than a width. In the depicted embodiment, the radius of the arc of each slot 146 is substantially equal, but in other embodiments may be unequal. Further the radius of the arc formed by each slot 146 is generally longer than the radius formed by central aperture 144, though in other embodiments not depicted, the radius of the arc formed by each slot 146 may be equal to, or smaller than the arc formed by central aperture 144.

Generally, each slot 146 may be characterized as having a concentric or non-concentric arc with respect to the arc formed by central aperture 144. For example, slots 278 and 280 form arcs that are concentric to central aperture 144, while slots 282 and 284 form arcs that are non-concentric to central aperture 144.

Each slot 146 may also be characterized as generally perpendicular or non-perpendicular to central aperture 144. For example, slots 286, 288, 290, 292 may be considered generally perpendicular, while slots 270, 280 may be considered non-perpendicular.

Referring to FIGS. 8d-8g, in an alternate embodiment, projector interface 104 includes an interface plate 119 that generally define a series of circular holes 145, rather than slots 146. In this embodiment, interface plate 119 is substantially the same as interface plate 118, with the exception of defining holes 145, rather than slots 146. As such, interface plate 119 generally includes two long perimeter walls 126, 128, two short perimeter walls 130, 132, floor 134, raised corners 136, 138, 140, 142, and defines a generally central aperture 144.

As depicted, interface plate 119 defines multiple holes 145. Holes 145 may be circular, and all have substantially the same diameter. In other embodiments, holes 145 may not be circular, and may be oval, square, or shaped as necessary to receive various embodiments of track assemblies 120. Holes 145 may be distributed in a relatively random manner in interface plate 119, or may be evenly distributed in a more uniform fashion as depicted.

Referring to FIGS. 9-12, projector interface generally includes multiple track assemblies 120. In the depicted embodiment, projector interface 104 includes three track assemblies 120a, 120b, 120c. In other embodiments, projector interface 104 may include four or more track assemblies 120. Track assembly 120a generally includes track bar 294a, a coupling portion in the form of engagement bracket 296a, pull cover 298a, and slide assembly 300a. It will be understood that additional track assemblies 120, including 120b and 120c, will be essentially the same as track assembly 120a, and will also generally include respective track bars 294, engagement brackets 296, pull covers 298 and slide assemblies 300.

Referring to FIGS. 13-16, track bar 294a includes engagement end 297a, mount end 299a, left and right side walls 301a, 302a, bottom wall 304a, left and right top walls 306a, 308a, left and right limit tabs 310a, 312a, left and right upper hooks 314, 316, left and right lower hooks 318, 320, and left and right bottom wall tabs 322, 324. Walls 301a, 302a, 304a, 306a, 308a generally include respective inside surfaces 326a, 328a, 330, 332a, 334a, defining track interior space 336a.

Figure 15A:
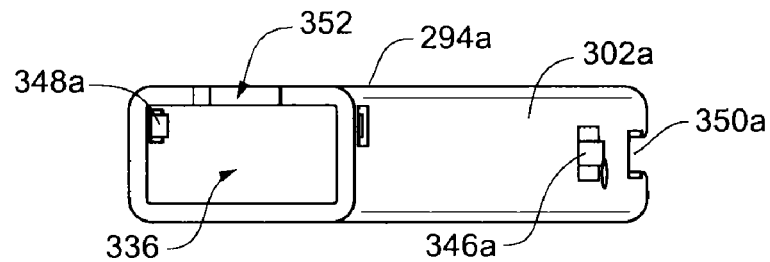
FIG. 15a is a front perspective view of the track bar of FIG. 13.
Figure 15B:
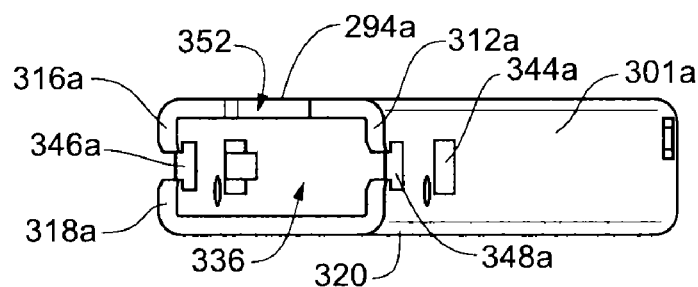
Figure 15C:
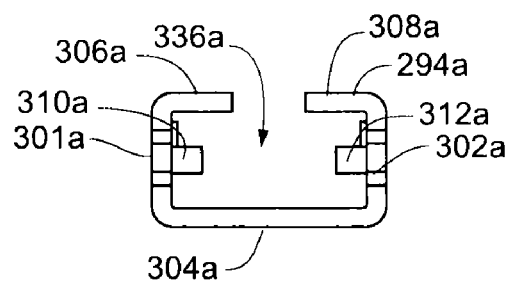
Figure 16A:
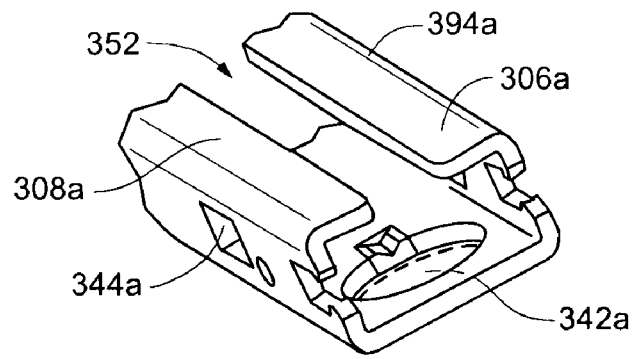
FIG. 16a is a fragmentary top-rear perspective view of the track bar of FIG. 13.
Figure 16B:
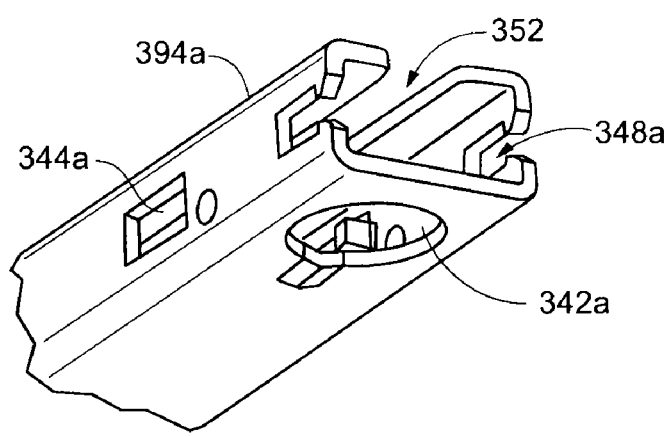
FIG. 16b is a fragmentary bottom-rear perspective view of the track bar of FIG. 13.

Left side wall 301a adjoins bottom wall 304 at the left side of track bar 294a, at a substantially right angle; right side wall 302a adjoins bottom wall 304a at the right side of track bar 294a, also substantially forming a right angle. As such, left side wall 301a, bottom wall 304a, and right side wall 302a form a U-shape when viewed from mount end 299a of track bar 294a, as depicted in FIG. 15c. The portions of track bar 294a where side walls 301a, 302a adjoin bottom wall 304a may be slightly rounded as depicted.

Left top wall 306a is adjoined to, and forms a right angle with left side wall 301a, while right top wall 308a; right top wall 308a is adjoined to, and forms a right angle with right side wall 302a. Left top wall 306a extends inwardly from left side wall 301a, lying in a plane parallel to bottom wall 304a; right top wall 308a extends inwardly from right side wall 302a, lying in a plane parallel to bottom wall 304a.

Track bar 294a defines a pair of rectangular mount-side apertures, left mount-end aperture 338a and right mount-end aperture 340a, engagement fastener receiving hole 342a, left engagement bracket receiving aperture 344a, right engagement bracket receiving aperture 346a, left and right side engagement slots 348a, 350a, track slot 352a, and cable hole 354.

Left and right mount-end apertures may be generally rectangular in shape and located at a far end of mount end 299a, near the top of their respective side walls 301a, 302a. Engagement fastener receiving hole 342a is generally circular and is located at engagement end 297a of track bar 294a, in bottom wall 304a. Hole 342a is generally equidistant from side walls 301a and 302a, with an inside diameter slightly larger than the outside diameter of engagement fastener 121a, such that a portion of engagement fastener 121a may be inserted into hole 342a without resistance. Although depicted as round, hole 342a may be of a different shape that is adapted to accommodate, or receive, engagement fastener 121a.

Left and right engagement bracket receiving apertures 344a, 346a are located at engagement end 297a of track bar 294a, and may be rectangular in shape as depicted in the embodiment of the figures. In other embodiments, the shape of apertures 344a, 346a may be non-rectangular in shape so as to receive alternative embodiments of engagement bracket 296a. Apertures 344a, 346a are may be equidistant from their respective top walls 306a, 308a, and bottom wall 304a, as depicted. The size, shape, and location of engagement brackets 344a, 346a will vary as needed in order to accommodate various embodiments and locations of engagement bracket 296a.

Left engagement slot 348a is located at engagement end 296a, and is defined by left side wall 301a, upper left hook 314a, and lower left hook 318a; right engagement slot 350a is located at engagement end 297a, and is defined by right side wall 302a, upper right hook 316a, and lower right hook 320a. A substantial portion of each engagement slot 348, 350 may be rectangular in shape, with respective narrowed openings at the distal engagement end 297 of track bar 294a.

Track slot 352a is defined by left and right side top walls 306a and 308a, is generally rectangular, and traverses the length of track bar 294a. The width of track slot 352 may vary as needed to receive a portion of slide assembly 300a, and in the depicted embodiment is approximately 30% to 40% of the width of bottom wall 304a, and approximately the same width as left and right top walls 306a and 308a.

Left and right cable holes 354a and 356a may be generally circular, and located near the distal end of engagement end 297a. Each cable hole 354a, 356a may be located between, and slightly below the center of, their respective engagement bracket receiving aperture and engagement bracket receiving slot. In other embodiments, cable holes 354a, 356a may be located elsewhere, so long as insertion of a cable 108 assembly does not interfere with the functioning of track assembly 120a. In some embodiments of track assembly 120a, track bar 294a does not include cable holes 354a, 356a.

Left and right limit tabs 310a and 312a are generally square or rectangular in shape and respectively project from left and right side walls 301a and 302a into track interior 346 toward their opposite respective side walls. Limit tabs 310a, 312a may be located as depicted adjacent to engagement end 297a of their respective engagement bracket receiving slots 344a, 346a.

Left and right bottom wall tabs 322a, 324a are located in bottom wall 304a adjacent to engagement fastener receiving hole 342 and generally project downward and away from bottom wall 304a. Tabs 322a, 324a may be generally square or rectangular in shape as depicted, with only a slight downward projection. In one embodiment, track bar 294a is made of a metal such as steel or aluminum, but in other embodiments may be made of plastic, fiberglass, or other materials of suitable strength.

Referring to FIGS. 17a-17c, slide assembly 300a of track assembly 120a generally includes slide bridge 358a and slide fastener 360a. Slide bridge 358a generally includes top portion 362a with guide projections 364a, 366a, 368a, 370a, top surface 372a, and left and right support tabs 374a, 376a. Guide projections 364a, 366a, 368a, 370a are located at the four corners of top portion 362a and project outward and away from top portion 362a at a substantially 90 degree angle. The engagement side of distal ends of guide projections 364a, 366a, may define notches 378a, 380a; the engagement side of distal ends of guide projections 368a, 370a, may define notches 382a, 384a. As depicted, notches 382a, 384a, 386a, 388a may generally form a 45° angle with respect to each guide projection, but may form other angles in other embodiments.

Left and right support tabs 374a and 376a are connected to top portion 362a, and bend downward and away from top portion 362a. Each support tab 374a and 376a generally form an obtuse angle with top portion 362a such that top portion 362a in combination with tabs 374a, 376a form a bridge-like structure as depicted in FIG. 17a. Support tabs 374a, 376a generally include bottom surfaces 386a, 388a.

Slide fastener 360a may be a threaded fastener such as a bolt or screw, and sized to be received by plate-track fastener 125a. Slide fastener 360a generally includes shaft 390a, threads 392a, and knurled base 394a. Top portion 358a of slide bridge 358a defines slide fastener hole 396. Slide fastener hold 396 is sized such that shaft 390a may be inserted through hole 396 such that base 394 contacts top portion 358a. Slide bridge 358a may optionally include a recess such that a bottom surface of slide fastener 396 is flush with a bottom surface of slide bridge 358. Slide fastener 396 may fit loosely into hole 396, may be pressed into hole 396 for a tight fit, or otherwise held in place.

Figure 18:
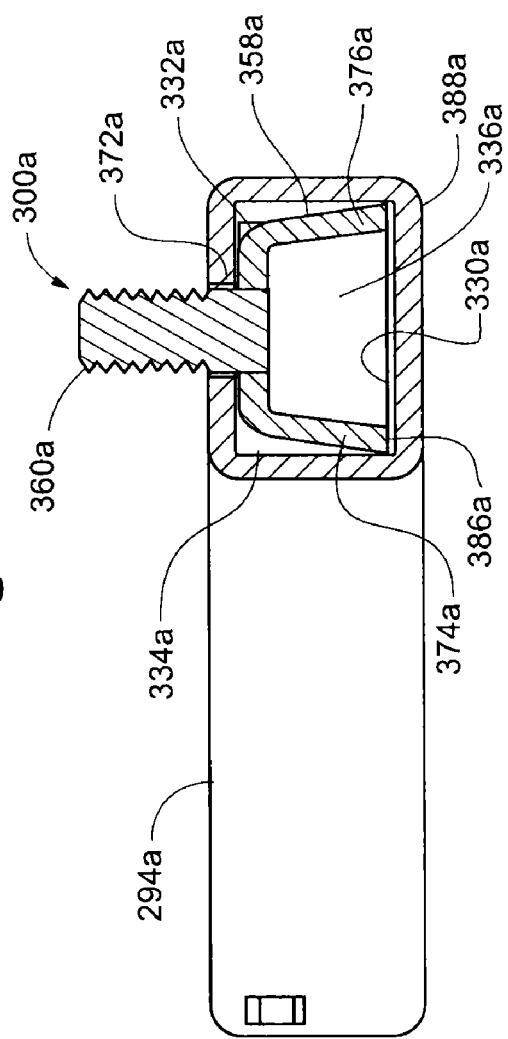
Figure 19C:
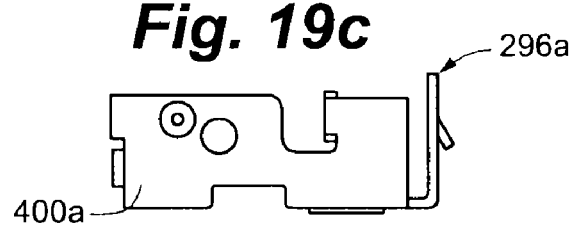
FIG. 19c is a side elevation view of the engagement bracket of FIG. 19.
Figure 19D:
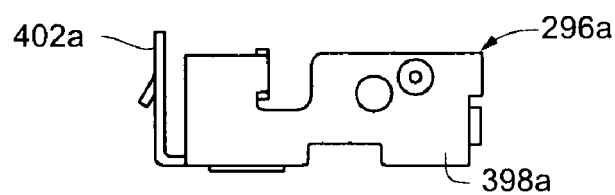
FIG. 19d is an opposing side elevation view of the engagement bracket of FIG. 19.
Figure 19E:
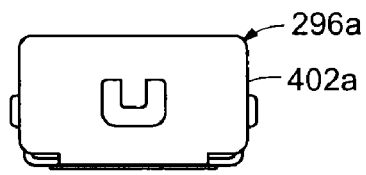
FIG. 19e is a rear elevation view of the engagement bracket of FIG. 19.
Figure 19F:
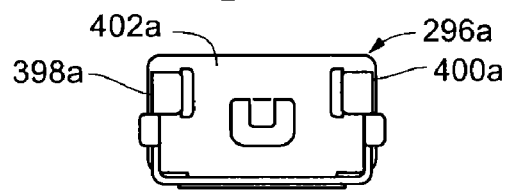
FIG. 19f is a front elevation view of the engagement bracket of FIG. 19.

Referring now to FIG. 18, this cross-sectional depiction of FIG. 18 illustrates the position of slide assembly 300a in relation to track bar 294a. Slide assembly 300a is slidably fit into track interior 336a such that slide bridge 358a is located entirely within track interior 336a, with slide bridge support tab bottom surfaces 386a, 388a in contact with track bar bottom wall inside surface 330a. Slide bridge top surface 372a may be in slight contact with left and right top wall inside surfaces 332a, 334a. Slide fastener 360a projects outward and away from track bar 294a through track slot 352.

Referring now to FIGS. 19a-f, engagement bracket 296a generally includes left wall 398a, right wall 400a, front wall 402a, and floor 404a. Each wall 398a, 400a, 402a is joined to floor 404a at a substantially 90° angle. Engagement bracket 296a may be steel, aluminum, or other bendable metal, as well as other formable materials including plastic, fiberglass, and composites.

Left wall 398a is generally flat and rectangular in shape and generally includes a left inner surface 406a, left outer surface 408a, left upper rear tab 410a, left lower rear tab 412a, left detent 414a, and left front tab 416a. Left rear tabs 410a, 412a are located at the rear, or mount side of left wall 398a, with tabs oriented at a generally 90° angle to left wall 398a. Left upper tab 410a projects inward toward right wall 400a, while left lower tab 412a projects outward away from left wall 398a. Tabs 410a, 412a are generally square, but may be rectangular, or shaped otherwise.

In the depicted embodiment, left detent 414a is located near the upper rear portion of left wall 398a, is generally circular, and with a concave curvature that projects inward toward right wall 400a. Left front tab 416a may be T-shaped as depicted, square, rectangular, or otherwise shaped, and projects inward toward right wall 400a.

Left wall 398a defines left engagement cable hole 418a, upper cutout 420a, and lower cutout 422a. Left engagement cable hole 418a is generally circular, similar in size to track bar 124 cable hole 354a, and located generally towards the rear of engagement bracket 296a. Upper cutout 420a may be generally square or rectangular and extending from the top of left wall 398a downward toward a middle portion of left wall 398a, and located slightly forward of the center of left wall 398a. Lower cutout 422a is generally rectangular in shape and extending from the bottom of left wall 398a upwards. The height of cutout 422a is generally less than the length. Lower cutout 422a extends horizontally along the lower portion of left wall 398a from approximately the center of left wall 398a in a rearwardly direction.

Right wall 400a is generally flat and rectangular in shape and generally includes a right inner surface 424a, right outer surface 426a, right upper rear tab 428a, right lower rear tab 430a, right detent 432a, and right front tab 434a. Right rear tabs 428a, 430a are located at the rear, or mount side of right wall 400a, with tabs oriented at a generally 90° angle to right wall 400a. Right upper rear tab 428a projects inward toward left wall 398a, while right lower rear tab 430a projects outward away from right wall 400a. Tabs 428a, 430a are generally square, but may be rectangular, or shaped otherwise.

In the depicted embodiment, right detent 432a is located near the upper rear portion of right wall 400a, is generally circular, and with a concave curvature that projects inward toward left wall 398a. Right front tab 434a may be T-shaped as depicted, square, rectangular, or otherwise shaped, and projects inward toward left wall 398a.

Right wall 400a defines right engagement cable hole 436a, upper cutout 438a, and lower cutout 440a. Right engagement cable hole 436a is generally circular, similar in size to track bar 124 cable hole 356a, and located generally towards the rear of engagement bracket 296a. Upper cutout 438a may be generally square or rectangular and extending from the top of right wall 400a downward toward a middle portion of right wall 400a, and located slightly forward of the center of right wall 400a. Lower cutout 440a is generally rectangular in shape and extending from the bottom of right wall 400a upwards. The height of cutout 440a is generally less than the length. Lower cutout 440a extends horizontally along the lower portion of right wall 400a from approximately the center of right wall 398a in a rearwardly direction.

Front wall 402a is generally flat and rectangular in shape, is connected to, and forms a 90° angle with, floor 404a. In some embodiments front wall 402a may be slightly taller and wider than both side walls 398a and 400a. Front wall 402a generally includes an outer surface 442a, inner surface 444a, centrally-located rectangular opening 446a, and outwardly projecting front wall tab 448a.

Front wall 402a together with left wall 398a defines a vertical slot 450a, such that front wall 402a is not connected to left wall 398a. Front wall 402a together with right wall 400a defines a vertical slot 452a, such that front wall 402a is not connected to right wall 400a. Front wall 402a together with floor 404a defines a pair of horizontal slots 454a and 456a, such that front wall 402a is only connected to floor 404a along a portion of the lower portion of front wall 402a.

Figure 20:
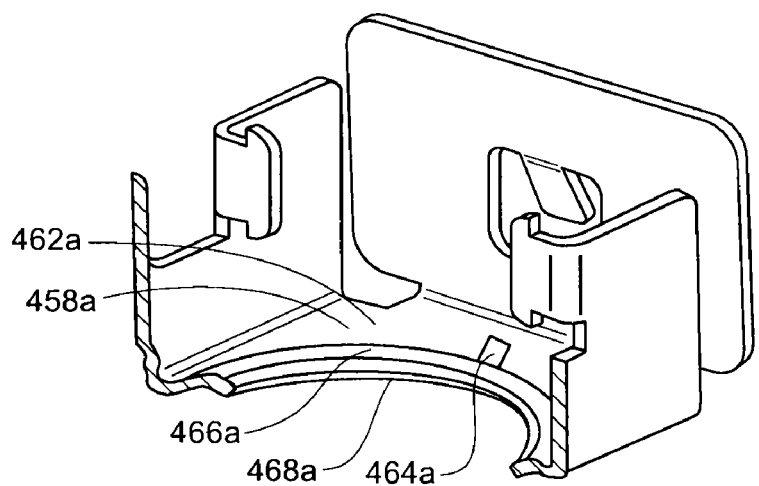
Figure 21A:
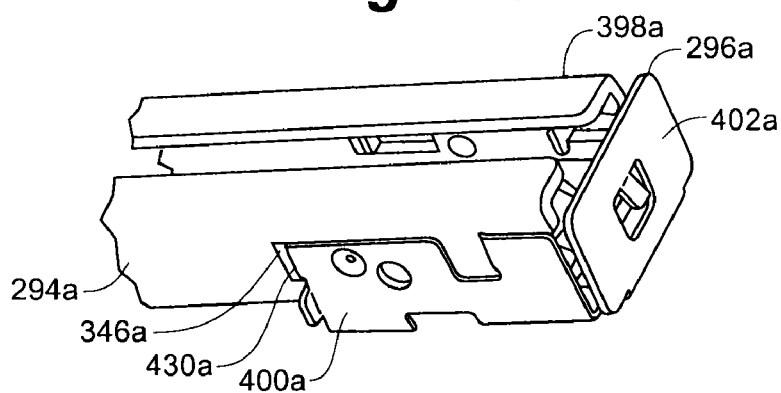
FIG. 21a is a fragmentary perspective view of the track bar of FIG. 13 and of the engagement bracket of FIG. 19.
Figure 21B:
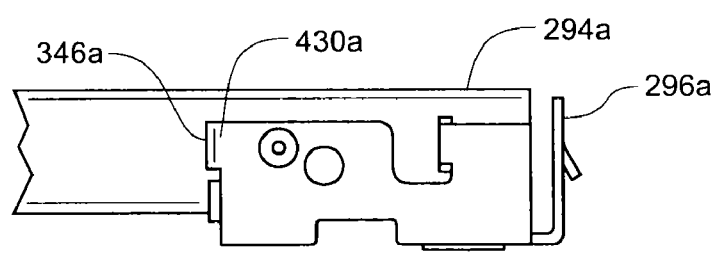
Figure 21C:
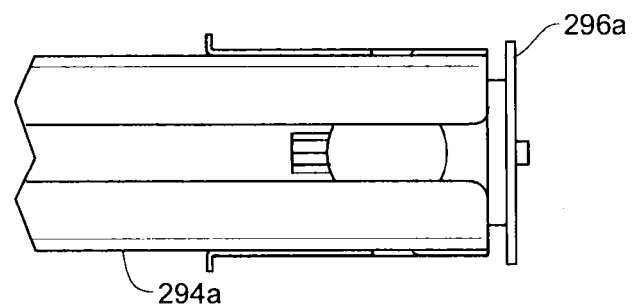
Figure 21D:
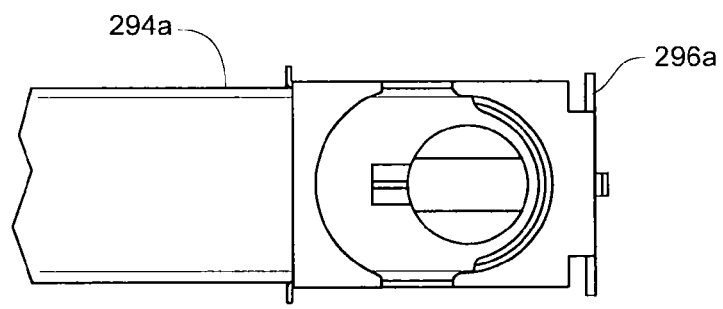
Figure 22A:
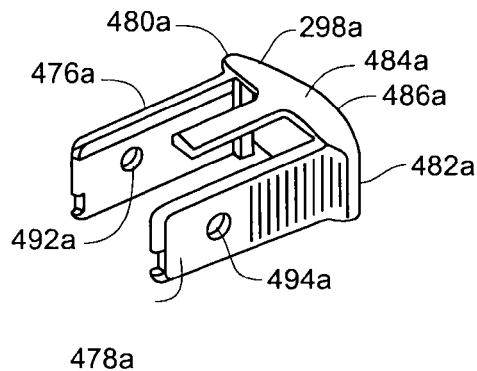
FIG. 22a is a perspective view of the pull cover of FIG. 12.
Figure 22B:
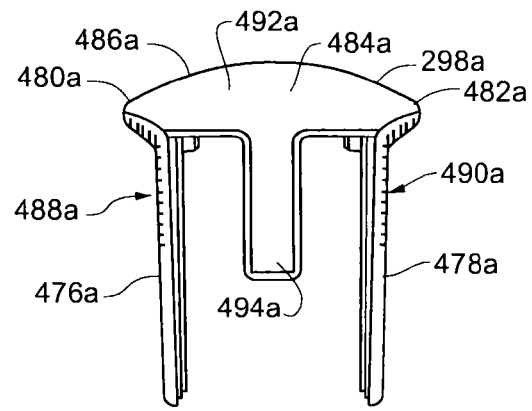
Figure 22C:
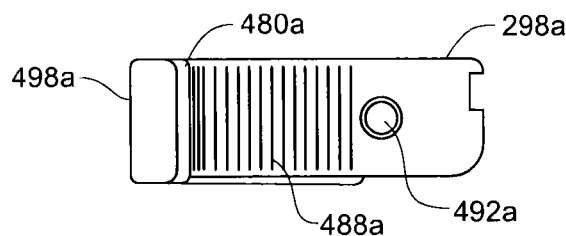
Figure 22D:
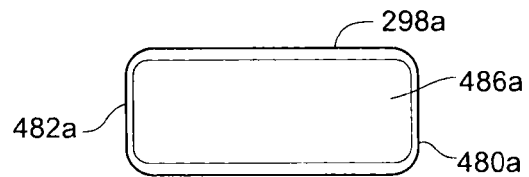

Referring to FIGS. 19 and 20, floor 404a is generally flat and rectangular in shape, and generally includes a front portion 458a and rear portion 460a. Front portion 458a generally includes an upper surface 462a, projection 464a, curved upper beveled edge 466a, and curved lower beveled edge 468a. In some embodiments, floor front portion 458a may only include a single beveled edge. Curved upper beveled edge 466a and curved lower beveled edge 468a are generally semi-circular, with edge 466 having an arc radius slightly longer than the radius of curved lower beveled edge 468a. The angle formed between curved upper beveled edge 466a and floor 404a is slightly larger, or steeper, than the relative angle between curved lower beveled edge 468a and floor 404a. Further, the distance from the left-most portion of each edge to the right-most portion is nearly equal to the distance between left wall 398a and right wall 400a.

Rear portion 460a of floor 404a generally includes an upper surface 470a and curved edge 472a. The arc of curved edge 472a spans from left wall 398a to right wall 400a with an arc radius that is slightly larger than either of the radii of curved beveled edges 466a and 468a of floor front portion 458a. Rear curved edge 472a of rear floor portion 460a, together with curved beveled edges 466a, 468a of floor front portion 458a, left wall 398a, and right wall 400a define engagement bracket opening 474a.

FIGS. 21a-21d depict engagement bracket 296a assembled onto track bar 294a in an engaged position. Engagement bracket 296a slidably mounts to engagement end 297a of track bar 294. Engagement bracket 296a upper left and right rear tabs 410a and 430a project through track bar 294a left and right engagement bracket receiving apertures 344a and 346a, respectively. Left and right wall inside surfaces 406a and 424a of engagement bracket 296a locate adjacent to, and in contact with, left and right walls 301 and 302, respectively. Detents 414a and 432a engage engagement bracket receiving apertures 344a and 346a, and cable holes 418a and 436a register with engagement bracket receiving apertures 344a and 346a. Engagement bracket left and right front tabs 416a and 434a extend through track bar left and right engagement slots 348a and 350a, nearest the rear-most end of slots 348a and 350a. As depicted, front wall 402a does not contact track bar 294a.

FIGS. 22a-22d depict pull cover 298a that generally includes a left wall 476, right wall 478, left projection 480a, right projection 482a, top portion 484a, and front portion 486a. Left and right walls 476a and 478a are generally flat and rectangular, and extend away from front portion 486a. Left and right walls include an outside surface each having a series of vertical striations 488 and 490. Left and right walls define a pair of generally circular cable holes 492, 494.

Left and right projections 480a, 482a extend outwardly away from walls 476a and 478a. Rear portions of projections 480a and 482a include striations 488a and 490a. Front portions of projections 480a, 482a are integral to pull cover front portion 498a, which is generally flat and curved. Top portion 484a is generally flat and T-shaped, and generally includes a head 492a and shaft 494a. Head 492a extends from left projection 480a to right projection 482a, while shaft 494a extends rearward from head 492 between walls 476a and 478b.

Figure 23A:
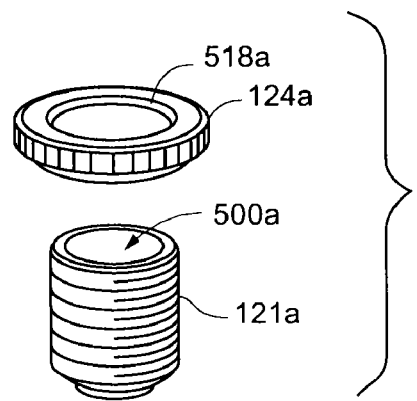
FIG. 23a is a perspective view of the engagement fastener and engagement collar of FIG. 12.
Figure 23B:
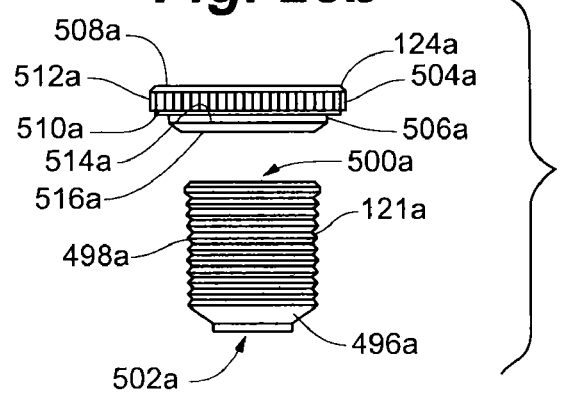
Figure 23C:
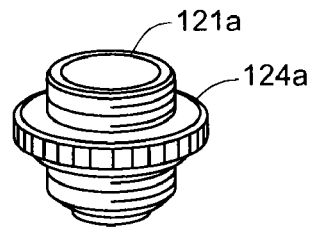
FIG. 23c is a perspective view of the engagement fastener and engagement collar of FIG. 23a, depicting the engagement collar threaded to the engagement fastener.

Pull cover 298a is adapted to fit on to engagement bracket 296a as depicted in the figures and discussed further below. FIGS. 23a-c depict the projector interface member in the form of engagement fastener 121a and engagement collar 124a. Engagement fastener 121a as depicted is a generally cylindrical, hollow threaded fastener that is open on both ends and generally includes a tapered base 496a, threaded shaft 498a, top hole 500a, and bottom hole 502a. The inside diameter of engagement fastener 121a is sized to receive fastener 123a (depicted in FIG. 12), while the diameter of bottom hole 502a is sized to receive a shaft of fastener 123a, but small enough not to allow the head of fastener 123a to pass through.

Figure 24A:
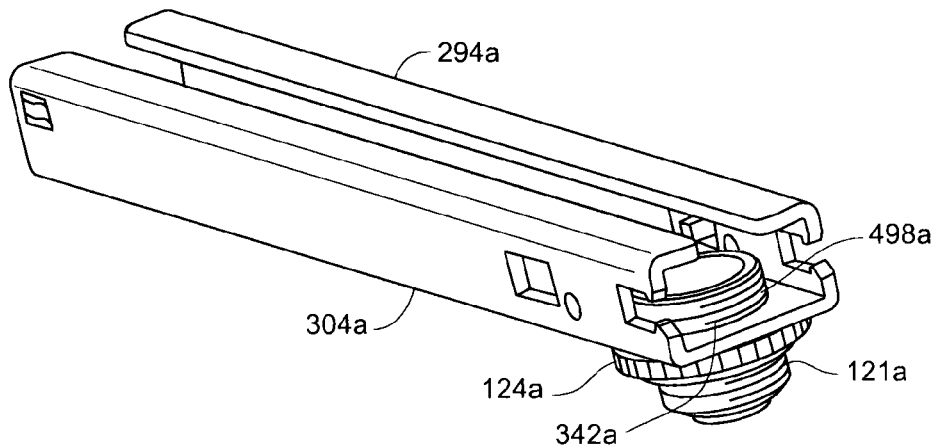
FIG. 24a is a perspective view of the track bar with engagement collar and fastener according to an embodiment of the invention.
Figure 24B:
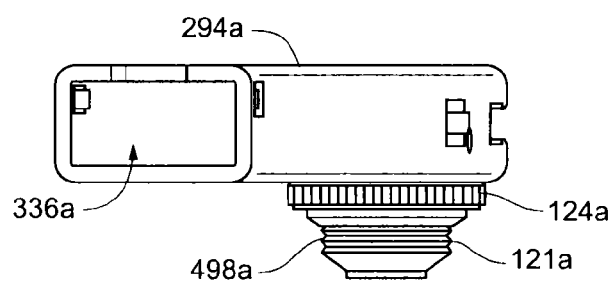

Engagement collar 124a generally includes an upper ring 504a, lower ring 506a, upper ring top surface 508a, upper ring bottom surface 510a, upper ring outer knurled surface 512a, lower ring outer surface 514a, lower ring bottom surface 516a, and inside threads 518. Engagement collar 124a is sized and threaded such that engagement collar 124a threads onto engagement fastener 121a, such that collar 124 may be positioned vertically along threaded shaft 498a of fastener 121a as depicted in FIG. 23c. Outer knurled surface 512a enables a user to grip and turn engagement collar 124a FIGS. 24a-b depict the assembled position of engagement fastener 121a and engagement collar 124a with respect to track bar 294a. As depicted, a portion of threaded shaft 498a protrudes through engagement fastener receiving hole 342a into track interior 336a, while a portion of threaded shaft 498 remains below track bar bottom wall 304a. The position of engagement collar 124a on threaded shaft 498a of engagement fastener 121a determines the depth of penetration of shaft 498a into interior space 336a. Also as depicted upper ring top surface 508 of engagement collar 124a abuts bottom wall 304a of track bar 294a surrounding engagement fastener receiving hole 342a.

Figure 25A:
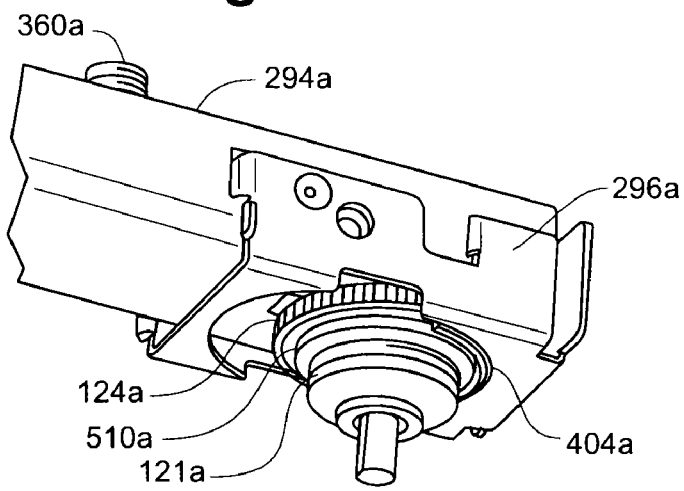
FIG. 25a is a perspective view of the track bar with engagement bracket, collar and fastener according to an embodiment of the invention.
Figure 25B:
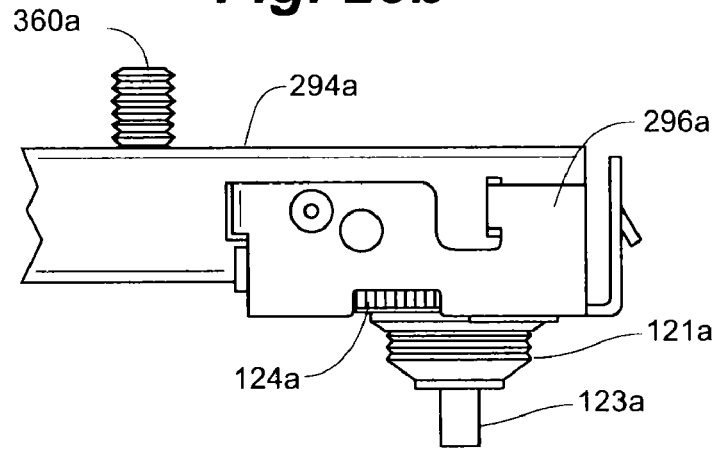

FIGS. 25a-c depict engagement bracket 296a holding engagement fastener 121a and engagement collar 124a in an engaged position with track bar 294a. As depicted, engagement bracket 296a is assembled to track bar 294a as described above. Also as depicted, engagement bracket 296a holds engagement fastener 121a and engagement collar 124a into the position relative to track bar 294a as described above with reference to FIG. 24. In particular, floor front portion 458 is received under engagement collar 124a, while upper ring top surface 508a of engagement collar 124a abuts track bar 294a, thereby tightly clamping to engagement collar 124a. It will be appreciated that projection 464a is disposed between engagement collar 124a and floor front portion 458, and that an upward biasing force will thus be exerted on engagement collar 124a at the point of contact with projection 464a. This biasing force tends to increase frictional engagement between the threads of engagement collar 124a and threaded shaft 498a of engagement fastener 121a, and thereby inhibiting undesired shifting of engagement collar 124a on threaded shaft 498a.

Referring to FIGS. 19 and 20, floor 404a is generally flat and rectangular in shape, and generally includes a front portion 458a and rear portion 460a. Front portion 458a generally includes an upper surface 462a, projection 464a, curved upper beveled edge 466a, and curved lower beveled edge 468a. In some embodiments, floor front portion 458 may only include a single beveled edge. Curved upper beveled edge 466a and curved lower beveled edge 468a are generally semi-circular, with edge 466 having an arc radius slightly longer than the radius of curved lower beveled edge 468a. The angle formed between curved upper beveled edge 466a and floor 404a is slightly larger, or steeper, than the relative angle between curved lower beveled edge 468a and floor 404a. Further, the distance from the left-most portion of each edge to the right-most portion is nearly equal to the distance between left wall 398a and right wall 400a.

FIG. 25c depicts pull cover 298a positioned over engagement bracket 296a with engagement fastener 121a and engagement collar 124a held into track bar 294a.

Referring to FIGS. 26a to 26f, the relational positions of engagement fastener 121a, engagement collar 124a, and engagement bracket 126a are depicted.

Figure 26A:
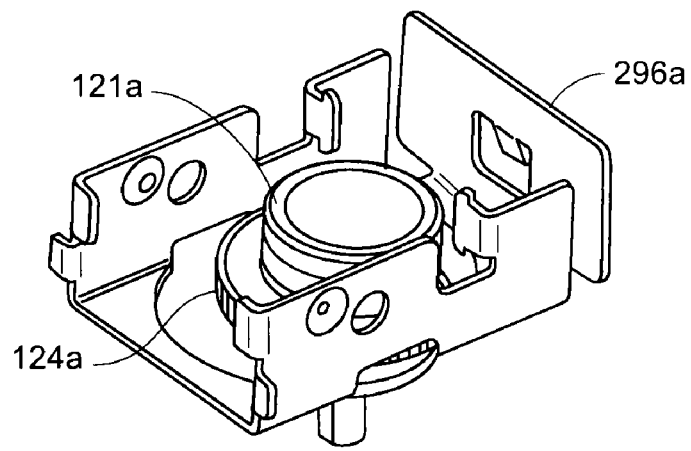
FIG. 26a is a perspective view of engagement bracket with collar and ring according to an embodiment of the invention.

FIG. 26a is a perspective view depicting engagement collar 124a threaded onto engagement fastener 121a and protruding through engagement bracket opening 474a of engagement bracket 296a. Fastener 121a and collar 124a are depicted in an engaged position as described above, such that fastener 121a and collar 124a are located in the forward side of engagement bracket opening 274a, and in contact with floor 404.

Figure 26B:
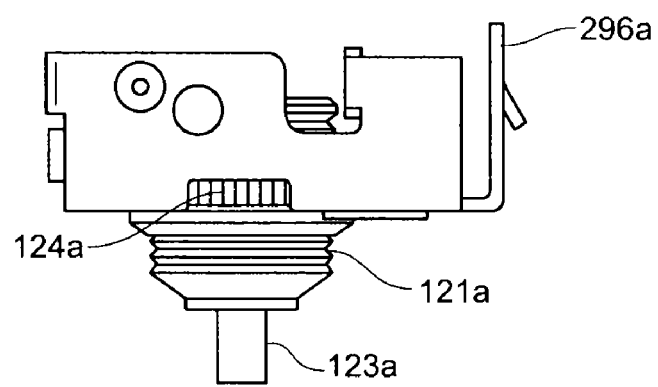
Figure 26C:
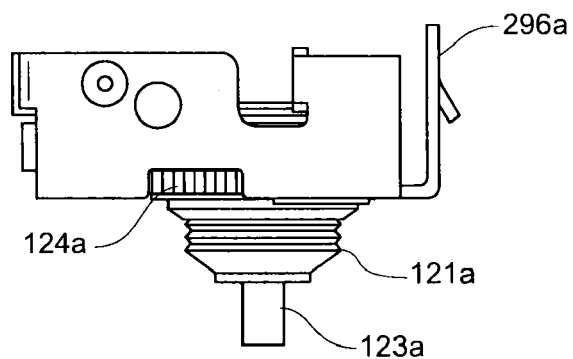

FIGS. 26b-c provide side views of fastener 121a and collar 124a relative to engagement bracket 296a.

Figure 26D:
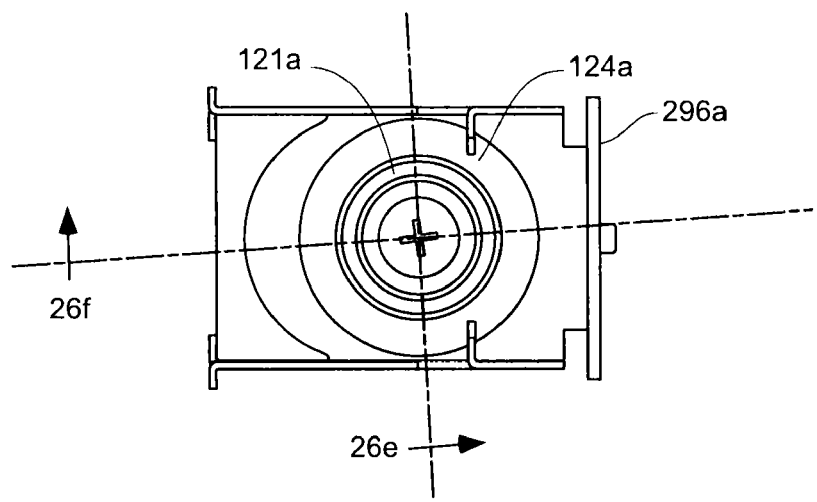
Figure 26E:
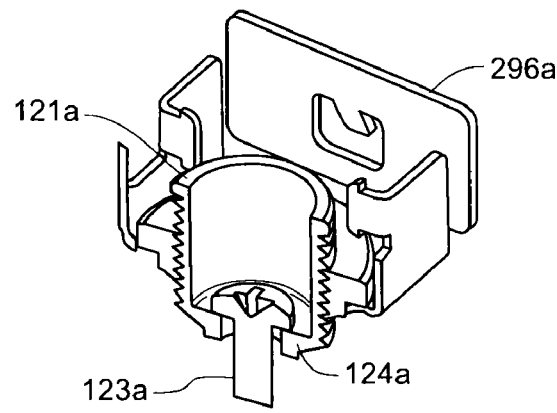
Figure 26F:
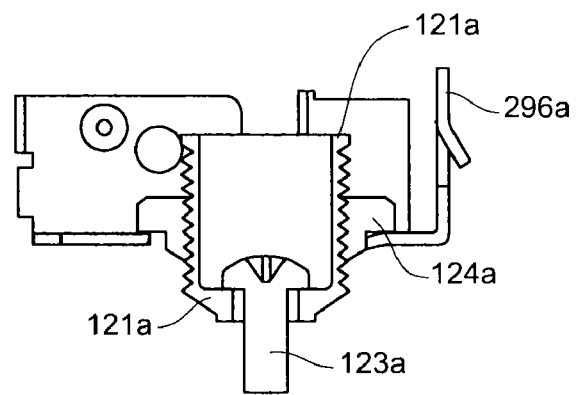

FIG. 26d provides a top view of the components as previously depicted in FIGS. 26a to 26c, while FIGS. 26e and 26f provide cross-sectional views.

FIG. 27 depicts a cross section of an assembled track assembly 120a and its respective components.

Referring again to FIGS. 1-2, in one embodiment, projector mount 106 is the projector mount described in U.S. Pat. No. 7,497,412, previously incorporated by reference. In this embodiment, projector mount 106 includes a base assembly 520, and a device orientation adjustment structure which includes guide assemblies 522, 524, and a support structure interface in the form of support structure interface assembly 526. In other embodiments, projector mount 106 may consist of other known projector mounts for securing and adjusting projector 102 to a pipe support 110.

Figure 3:
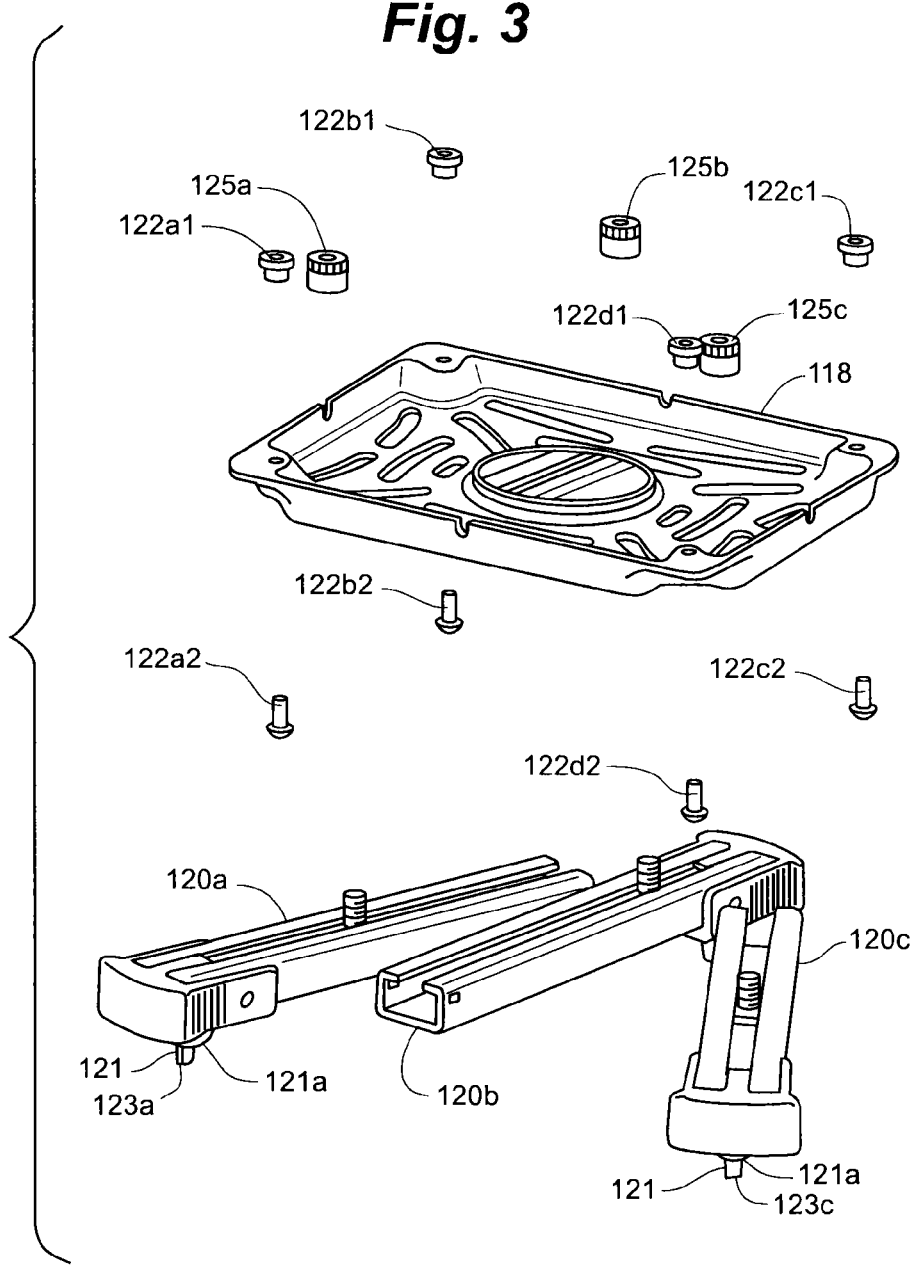
FIG. 3 is an exploded perspective view of the track assemblies and interface plate of FIG. 1.

Projector mount 106 is operably coupled to projector interface 104 via plate-mount fastener 122a, 122b, 122c, 122d. Referring to FIG. 3, plate-mount fastener sets 122a, 122b, 122c, 122d may each generally include an upper plate-mount fastener 122a1, 122b1, 122c1, 122d1, respectively, and a lower plate-mount fastener 122a2, 122b2, 122c2, 122d2, respectively. In other embodiments, plate-mount fastener sets 122 may include only a single fastener, or more than two fasteners. Further details regarding the structure, mounting, and operation of projector mount 106, and of the manner of engagement with the plate-mount fasteners may be found in U.S. Pat. No. 7,497,412.

Still referring to FIGS. 1-2, a locking member in the form of optional cable assembly 108 includes a cable 528 and a cable lock mechanism 530. Cable 528 may be threaded through the various cable holes associated with track assemblies 120 as described above and as depicted in FIG. 1. Cable lock mechanism 530 secures the ends of cable 528 together, thereby forming a continuous loop that passes through each track assembly 120. In one embodiment, cable lock mechanism 530 may be a mechanical lock such as a key-operated padlock. In other embodiments, cable lock mechanism may be a simpler, single use device, such as the one depicted, that latches about multiple portions cable 528 to form a closed loop. Such an embodiment of cable lock mechanism 530 may require that cable 528 be cut in order to remove cable 528 from projector interface 104.

In general operation and referring to FIGS. 1-28, projector interface 104 is mounted to projector 102, projector mount 106 is mounted to projector interface 104, support pipe 110 is fastened into projector mount 106, and the entire system 100 hangs downward from a ceiling or other overhead structure. A user generally manipulates projector interface 104 and projector mount 106 to adjust the position of projector 102 such that it appropriately directs an image to an intended display surface.

More specifically, and referring to FIGS. 1-2 and 12, at initial set up, each engagement fastener 121a, 121b, 121c is fastened to projector 102 by inserting fasteners 123a, 123b, 123c, into hollow engagement fasteners 121a, 121b, 121c, respectively, and threading each fastener 123a, 123b, 123c, into a corresponding mounting hole 114 (not shown) in projector mounting surface 112. Each projector engagement collar 124 is threaded onto its respective engagement fastener 121. Threading collar 124 further down on fastener 121 such that collar 124 is located relatively close to projector mounting surface 112 will cause track assembly 120 to also be relatively closer to projector mounting surface 112 as described below in further detail.

If projector interface 104 is pre-assembled, plate-track fasteners 125 may be loosened such that track assemblies 120 may be moved relative to interface plate 118. Fasteners 125 in one embodiment may be loosened or tightened by hand, and in other embodiments require a tool to be inserted into fastener 125 to facilitate rotation of the fastener. In one embodiment, such a tool may be placed on to interface plate 118, and hidden from the sight of a projector user until such time that it is needed. Because interface plate 118 forms a shallow tray, any variety of small tools may be stowed in the tray formed by interface plate 118.

Figure 4:
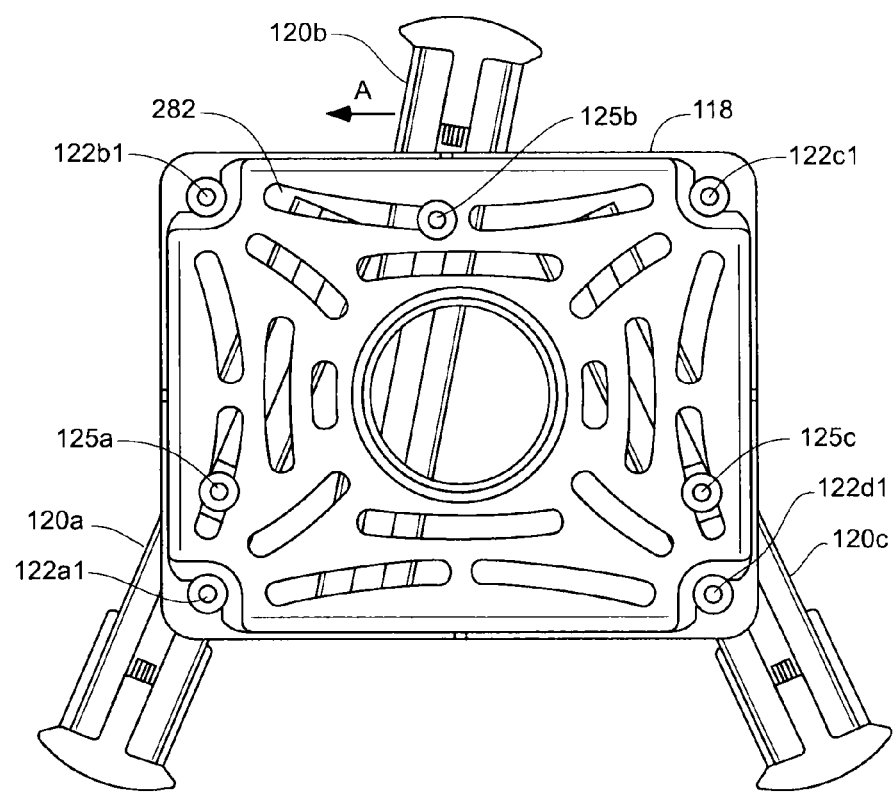
FIG. 4 is a top plan view of the track assemblies and interface plate of FIG. 3.
Figure 5:
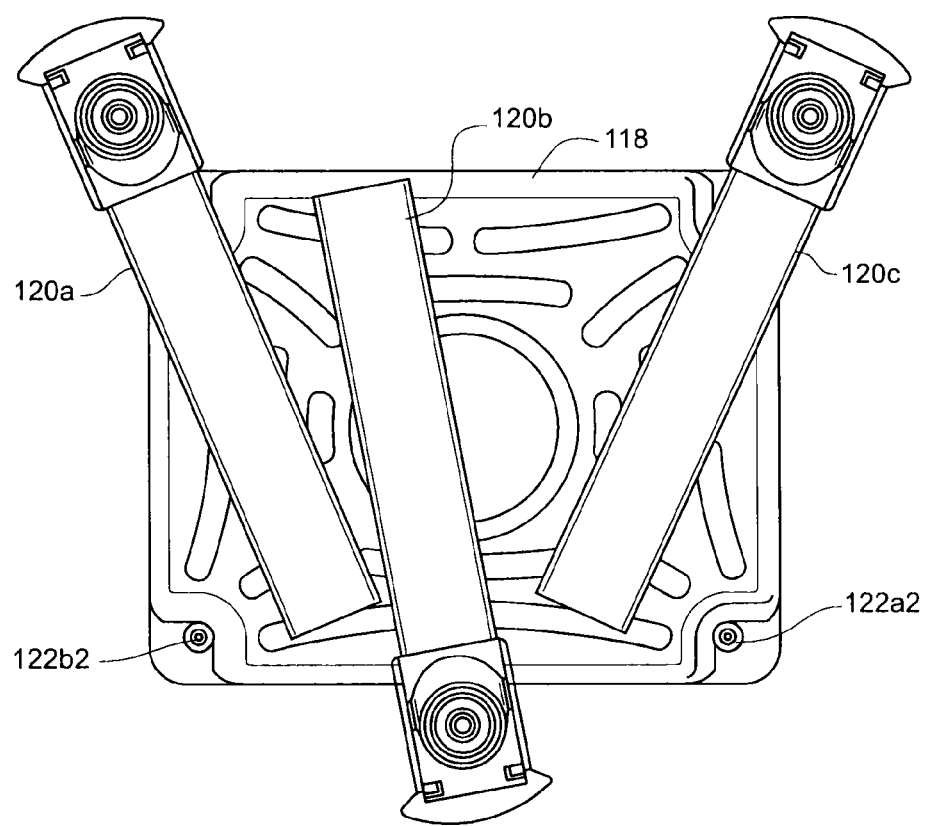
FIG. 5 is a bottom plan view of the track assemblies and interface plate of FIG. 3.
Figure 6A:
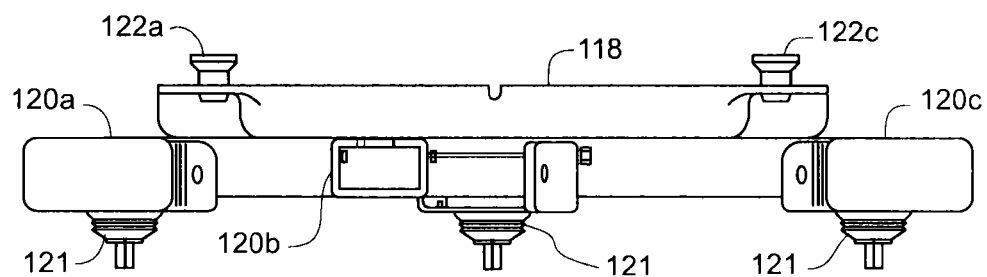
FIG. 6a is a front elevation view of the track assemblies and interface plate of FIG. 3.
Figure 6B:
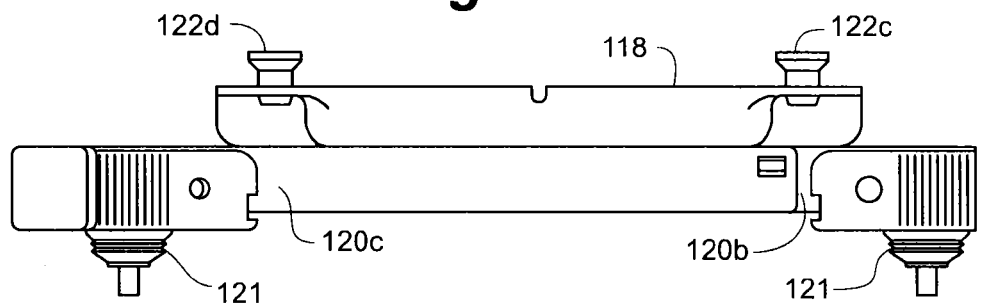
FIG. 6b is a side elevation view of the track assemblies and interface plate of FIG. 3.
Figure 6C:
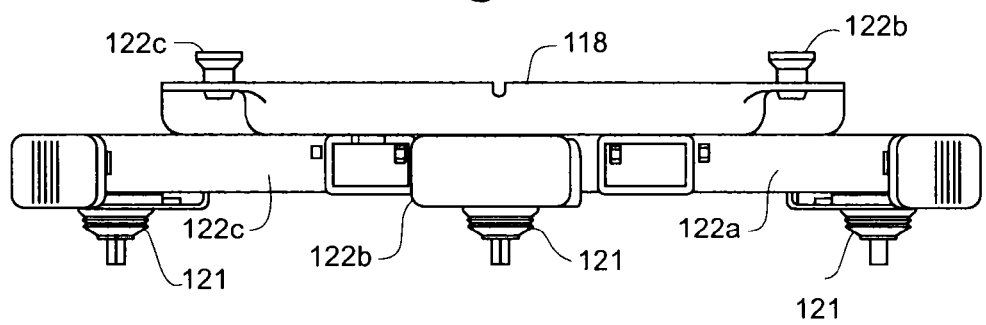
FIG. 6c is a rear elevation view of the track assemblies and interface plate of FIG. 3.

Referring more specifically to the arrangement depicted in FIG. 4, plate-track fastener 125b is threaded onto slide fastener 360b, which protrudes through slot 282. As such, track assembly 120b is held loosely to interface plate 118, and may be moved along slot 282 in a direction generally indicated by arrow A, or more generally may be moved back and forth along the previously defined x-axis. Further, slide mount assembly 300b may be slid along track slot 352b allowing track bar 294a to be moved generally along the y-axis. Further track assembly 120b may be pivoted about slide fastener 360b, such that track assembly 120b may be moved freely about an x-y plane, limited generally only by the length of track bar 294a and size and shape of slot 282.

Although track assembly 120b is depicted as operably coupled to interface plate 118 at slot 282, track assembly 120b could be moved to an alternative slot so as to move track assembly 120b to another slot and location relative to interface plate 118 in order to accommodate the location of projector mounting holes 114, or to adjust the aim of projector 102.

When projector interface 104 includes interface plate 119 with holes 145, rather than slots 146, track assemblies 120 may be moved relative to plate 119 in much the same way as described above with reference to interface plate 119. When projector interface 104 uses interface plate 119, slide fasteners 360 protrude through holes 145, rather than slots 146. In this particular embodiment, slide fasteners 360 are fixed in position relative to interface plate 119, though track assemblies 120 may still move relative to interface plate 119 by changing the position of track bars 294 in relation to slide assemblies 300.

Similarly, track assemblies 120a and 120c may be moved and adjusted in a similar manner so as to accommodate a variety of projector 102 types and projector viewing environments. As such, projector interface 104 functions as a universal projector interface that may be used with a variety of projectors 102 and projector mounts 106.

In use, projector 102 is coupled to projector interface 104 by shifting engagement bracket 296a on track bar 294a. With engagement bracket 296a pushed onto track bar 294a to the limit of its travel, engagement bracket opening 474a and engagement fastener receiving hole 342a are registered. The top of threaded shaft 498a is received through engagement fastener receiving hole 342a with upper ring top surface 508 of engagement collar 124a abutting bottom wall 304a of track bar 294a surrounding engagement fastener receiving hole 342a. With engagement fastener 121a received in this fashion, engagement bracket 296a can be pulled outward relative to track bar 294a. Front portion 458a of engagement bracket floor 404a is received under engagement collar 124a, while upper ring top surface 508 of engagement collar 124a is urged against bottom wall 304a of track bar 294a, thereby tightly clamping track bar 294a to engagement fastener 121a. Each track assembly 120a, 120b, 120c, is thereby quickly and easily secured to an engagement fastener on projector 102.

In some instances, after projector mounting system 100 is set into place and properly adjusted via projector interface 104 and projector mount 106, it may be desirable to remove projector 102. For example, projector 102 may require replacement, servicing, or a simple bulb replacement. Most projectors 102 include an access door 116 similar to the one depicted in FIGS. 1-2 that must be opened to replace a projector bulb, or to otherwise perform service on projector 102. To fully open access door 116, projector 102 must be removed from projector interface 104. In such instances, the track assemblies can be quickly disengaged for projector removal or service simply by pushing the engagement brackets onto the track arms such that front portion 458a of engagement bracket floor 404a slides out from under engagement collar 124a, thereby releasing the engagement fasteners.

In contrast, when a projector is reinstalled into a previous mounting system that does not include projector interface 104 of the present invention, the projector 102 must typically be readjusted for roll, pitch, and yaw. As noted previously, this process may be very time consuming and difficult due to the generally limited adjustment capability of the mounting system.

When a projector 102 is installed as part of mounting system 100 that includes projector interface 104, however, such time-consuming readjustment procedures are eliminated. The only parts that need to be shifted in order to remove and reinstall projector 102 are the sliding engagement brackets, which interface with the engagement fasteners on the projector in nearly precisely the same orientation upon reinstallation as upon removal. In this way, the alignment positioning of the projector is maintained without further adjustment even after the projector is removed for service and reinstalled.

FIGS. 26-27, depict track assembly 120a engaged with engagement fastener 121a and engagement collar 124a. Engagement fastener 121a and engagement collar 124a are located in a forward-most position relative to engagement bracket opening 474a. The arc radii of beveled edges 466, 468 are less than the radius of collar top ring collar 504a, such that a portion of top ring bottom surface 510 rests on bracket floor front upper surface 462a. Bracket beveled edges are in contact with a portion of collar lower ring outer surface 514a. In this engaged position, tabs 416a, 434a are in a forward-most position in slots 348a, 350a, respectively, while tabs 410a, 430a are in a forward-most position in apertures 344a, 346a, respectively.

When track assembly 120a is attached to projector interface 104, engagement fastener 121a is attached to projector 102, and projector 102 is otherwise suspended in place by mounting system 100, projector interface 104 is in the "engaged" or locked position with projector 102. As such, projector 102 is attached to track assemblies 120. The weight of projector 102 creates a downward force due to gravity on engagement fasteners 121 and collars 124 which are engaged with engagement brackets 296, thereby tending to hold track assemblies 120 and projector 102 in place.

Figure 28A:
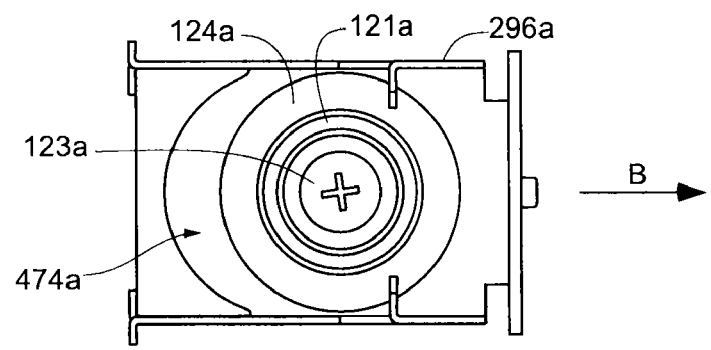
FIG. 28a is a top view of engagement bracket, collar, and ring according to an embodiment of the present invention in a locked position.

FIG. 28a is a top view of engagement bracket 296a, engagement fastener 121a, engagement collar 124a, and fastener 123a, assembled together in an engaged position such that projector interface 104 supports projector 102 in an aligned and adjusted position.

Figure 28B:
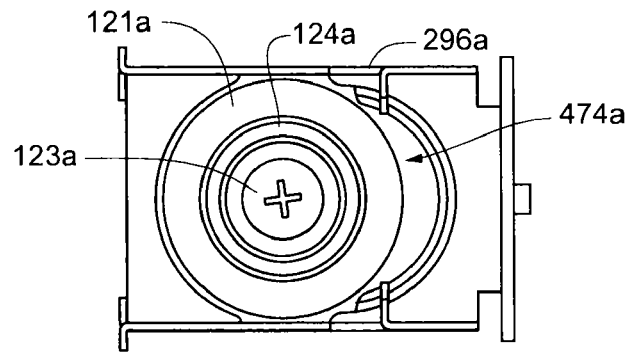
FIG. 28b is a top view of engagement bracket, collar, and ring according to an embodiment of the present invention in an unlocked position.

FIG. 28b is a top view of engagement bracket 296a, engagement fastener 121a, engagement collar 124a, and fastener 123a, in a disengaged position. In this position, engagement bracket 268 has been moved in a direction indicated by arrow B of FIG. 28a to a disengaged position of FIG. 28b. As such, the position of engagement fastener 121a with collar 124a is changed such that fastener 121a and collar 124a are located towards the rear, or mount-side, of engagement bracket opening 474a.

In this disengaged position, tabs 416a, 434a are in a rearward position in slots 348a, 350a, respectively, while tabs 410a, 430a are in a rearward position in apertures 344a, 346a, respectively. The radius of engagement bracket rear floor portion is larger than the radius of engagement collar 124a, such that engagement fastener 121a with collar 124a attached to projector 102 may be pulled downward away from track assembly 120a.

Figure 28C:
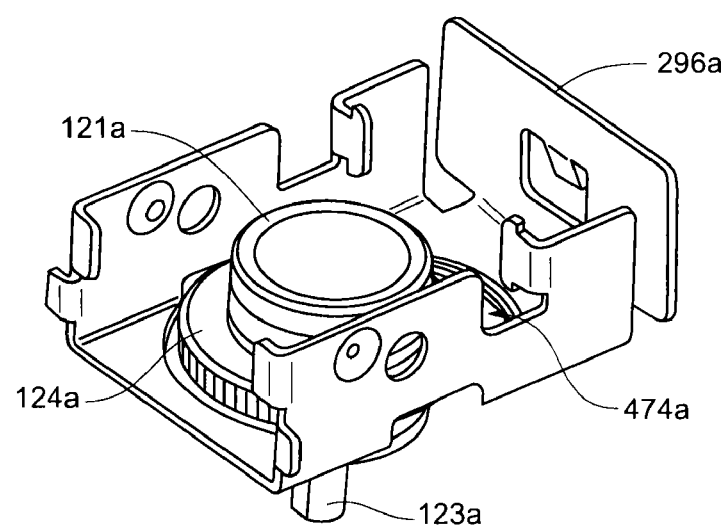
FIG. 28c is a perspective view of engagement bracket, collar, and ring of FIG. 28b.

To move an engagement bracket 296 back and forth between an engaged and disengaged position as depicted in FIG. 28, a user may grip a pull cover 298 at cover projections 480 and 482 and pull cover 298 and attached bracket 296 in a direction of arrow B to engage, or push in a direction generally opposite to direction B to disengage.

As such, the position of projector interface 104 relative to projector mount 106 remains fixed, with both assemblies remaining attached to support pipe 110. Accordingly, when projector 102 is reattached to projector interface 104, projector 102 is placed into substantially the same position it was in prior to removal, and no projector readjustment is required.

In addition to the devices, systems, and methods described above, the present invention also includes a method of providing a projector interface as substantially described above and a set of instructions for using the projector interface. More specifically, the method includes the step of providing a universal projector interface 104 that includes a plate 118 with openings, operably coupled to a plurality of track assemblies 120, and wherein the projector interface is adapted to operably couple a projector 102 to a projector mount 106, such that after initial adjustment, projector 102 may be disconnected from, then reconnected to, projector interface 104 without readjusting the relative positions of the projector 102, interface 104, and interface mount 106. The method also includes the step of providing a set of instructions that instruct a user on how to attach and detach the projector interface 104 to a projector 102 and a projector mount 106.

In FIGS. 29a-41 there are depicted various alternative coupling portion and corresponding projector interface member embodiments. Depicted in FIG. 29a is a bayonet mount arrangement 600a which generally includes projector interface member 98 and bayonet portion 602. Projector interface member 98 generally includes barrel portion 600 and threaded interface 601. Barrel portion 600 defines horizontally opposed hooked slots 600a, 600b. Threaded interface 601 is adapted to thread into threaded mounting apertures (not depicted) typically provided on a projector 102. Bayonet portion 602 generally includes cylindrical body 603 with horizontally opposing projections 603a, 603b. Projections 603a, 603b, are disposed so as to correspond with hooked slots 600a, 600b.

In use, threaded interfaces 601 are threaded into apertures of the projector 102 so that barrel portions 600 face upward. Bayonet portions 602 are rotatably attached to the bottom face of each of track assemblies 120a, 120b, 120c. The track assemblies 120a, 120b, 120c, are then positioned so that each bayonet portion 602 is registered with one of barrel portions 600. Projector 102 is then coupled to universal projector interface 104 by advancing bayonet portions 602 into barrel portions 600 with projections 603a, 603b, registered with hooked slots 600a, 600b. Bayonet portions 602 are then rotated relative to track assemblies 120a, 120b, 120c, to hook projections 603a, 603b, into hooked slots 600a, 600b. Removal is the reverse of installation.

Referring to FIGS. 29b1 and 29b2, a coupling portion in the form of a watch band-like clasp mechanism 605 may be employed to attach a projector 102 to a projector interface 104. In this embodiment, projector interface 104 includes a track assembly 120a, 120b, 120c, presenting end 604 with attached clamp 606. Clamp 606 is adapted to clamp to a projector interface member in the form of dome-topped projection 608 attached to a portion 610 of projector 102, thereby locking projector 102 to projector interface 104.

Referring to the embodiment of FIG. 29c, coupling portions 611 are disposed on an end of each of track assemblies 120a, 120b, 120c, and each generally includes bifurcate receiving portion 612 and sliding key 622. Receiving portion 612 defines horizontal slot 614 separating branches 613a, 613b, with transverse aperture 616 extending through both branches 613a, 613b. Key 622 defines keyhole slot 624 and guide slots 625. Spring 627 projects from end 627a of key 622. Key 622 is received in slot 614 with guide posts 629 extending through guide slots 625. Spring 627 bears on back wall 614a and biases key 622 outward. Projector interface member 617 generally includes domed projection 618 defining horizontal groove 618a. Threaded portion 620 threads into an aperture (not depicted) on projector 102.

In use, key 622 is pressed inward against the bias of spring 627 until large portion of keyhole slot 624 is registered with aperture 616. Coupling portion 611 can then be engaged over projector interface member 617 such that projector interface member 617 extends through keyhole slot 624 and aperture 616. With key 622 registered with groove 618a, key 622 can be allowed to spring outward, biased by spring 627. Projector interface member 617 engages in the narrower neck portion of keyhole slot 624, thereby retaining coupling portion 611 on projector interface member 617. Removal is the reverse of installation.

Referring to FIG. 29d, track assemblies 120a, 120b, 120c, each include a coupling portion 626 defining a key slot 628. Projector interface member 630 is threaded into an aperture (not depicted) on projector 102 and is adapted to fit through key slot 628. Projector interface member 630 is inserted through slot 628, and projector interface member 630 is rotated ¼ turn, hence locking projector 102 to projector interface 104. Removal is the reverse of installation.

Figure 30A:
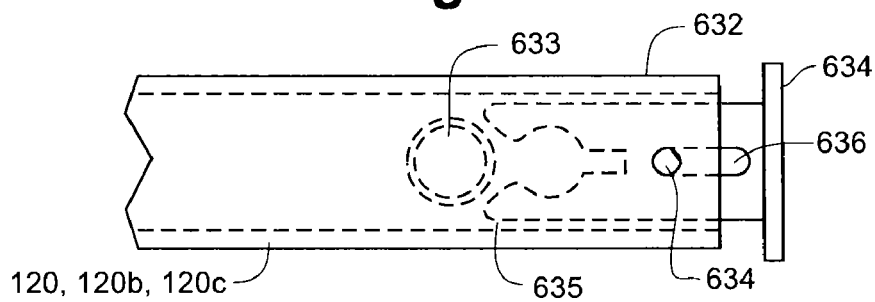
FIG. 30a is a top view of a slide latch mechanism of a projector interface according to an embodiment of the invention.
Figure 30B:
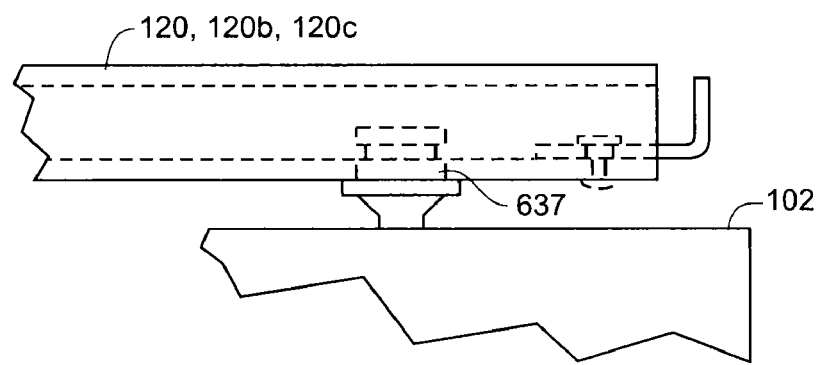
FIG. 30b is a side view of a slide latch mechanism of a projector interface according to an embodiment of the invention.

Referring to FIGS. 30a-30b, projector interface 104 generally includes track assembly 120a, 120b, 120c with end 632 defining aperture 633, and a coupling portion in the form of post 634, and coupling slide 635 defining guide slot 636. A projector interface member in the form of grooved post 637 projects outward from projector 102. Coupling slide 634 slides relative to track bar 632, with post 634 engaging and riding in guide slot 636. Grooved post 637 is sized to be inserted through aperture 633 of end 632. When grooved post 637 is inserted through aperture 633 of end 632, slide 634 may be advanced toward grooved post 637 such that bifurcate end 635 of slide 634 engages around grooved post 637 to couple into end 632 such that slide 634 engages grooved post 637, thereby locking projector 102 to track assembly 120a, 120b, 120c.

Figure 31A:
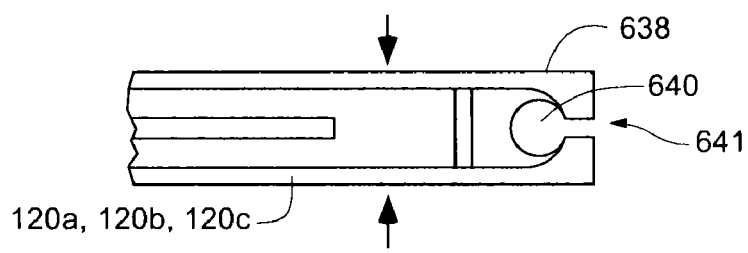
FIG. 31a is a top view of a squeeze latch mechanism of a projector interface according to an embodiment of the invention in a locked position.
Figure 31B:
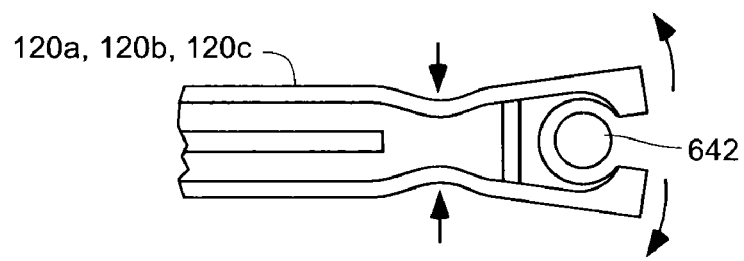
FIG. 31b is a top view of a squeeze latch mechanism of a projector interface according to an embodiment of the invention in an unlocked position.

Referring to FIGS. 31a-31b, a coupling portion in the form of squeeze latch mechanism 641 is used to attach a track assembly 120a, 120b, 120c, of projector interface 104 to a projector 102. In this embodiment, track assembly 120a, 120b, 120c, includes a resilient squeezable end 638 which defines an opening 640. Force is applied to two sides of squeezable end 638 such that opening 640 opens up as depicted in FIG. 31b. As such, pressure may be applied to squeezable end 638 as depicted in FIG. 31a to expand opening 640. End 640 may then be placed over a projector interface member in the form of post 642 projecting from projector 102 and the pressure released, thereby attaching projector interface 104 to projector 102. Removal is the reverse of installation.

Figure 32:
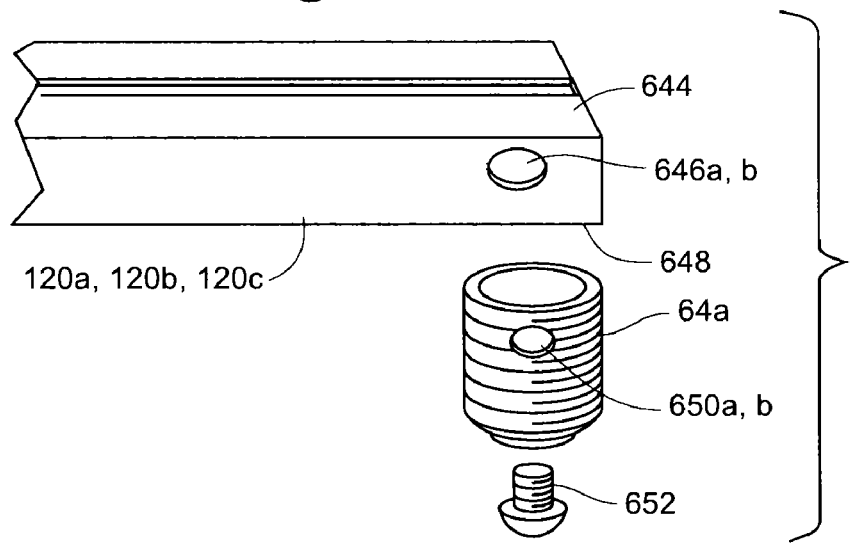
FIG. 32 is an exploded perspective view of a cross-pin latch mechanism of a projector interface according to an embodiment of the invention.

Referring to FIG. 32, track assembly 120a, 120b, 120c, projector interface 104 includes a coupling portion in the form of bar end 644. End 644 defines a pair of small side apertures 646a, 646b, and a larger bottom aperture 648 (not depicted). A projector interface member in the form of engagement fastener 649 defines side holes 650a, 650b, and is attached to a projector 102. End 644 is placed over fastener 649 such that fastener 649 extends through aperture 648. Apertures 650a, 650b register with apertures 646a, 646b, respectively. Pin 652 is inserted through apertures 650a, 650b, 646a, 646b, thereby coupling projector interface 104 and projector 102.

Figure 33:
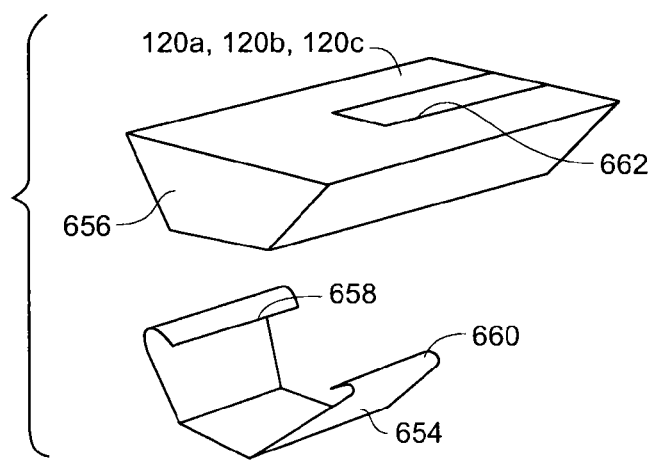
FIG. 33 is a an exploded perspective view of a spring clip latch mechanism of a projector interface according to an embodiment of the invention.

Referring to FIG. 33, in another embodiment, each track assembly 120a, 120b, 120c, includes a coupling portion in the form of spring clip 654 adapted to receive an end portion 656 of track assembly 120a, 120b, 120c. End portion 656 and spring 654 may be trapezoidally shaped as depicted. Spring clip 654 includes end tabs 658 and 660 that forcibly contact top surface 662, thereby holding end 656 of track assembly 120a, 120b, 120c, to projector 102 via spring clip 654.

Figure 34A:
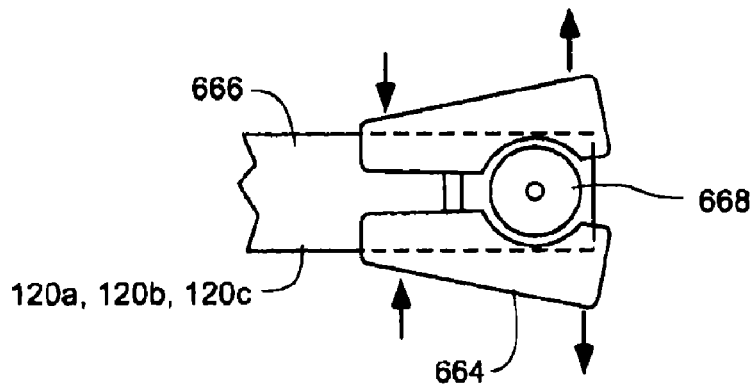
FIG. 34a is a top view of another squeeze latch mechanism of a projector interface according to an embodiment of the invention in an unlocked position.
Figure 34B:
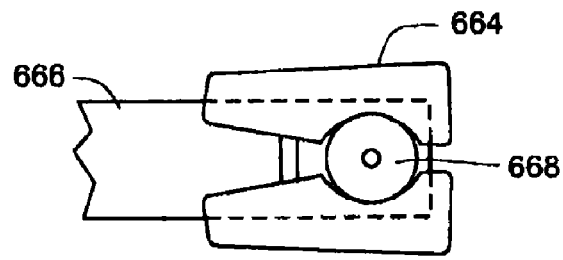
FIG. 34b is a top view of another squeeze latch mechanism of a projector interface according to an embodiment of the invention in a locked position.

Referring to FIGS. 34a-34b, projector interface 104 includes a coupling portion in the form of squeeze mechanism 664 attached to an end 666 of track assembly 120a, 120b, 120c, of projector interface 104. As depicted in FIG. 34b, squeeze mechanism 664 grips a projector interface member in the form of projector post 668 when force is not applied to it. When force is applied to mechanism 664 as depicted in FIG. 34a, the grip on post 668 is released, allowing easy removal of projector 102 from projector interface 104.

Figure 35:
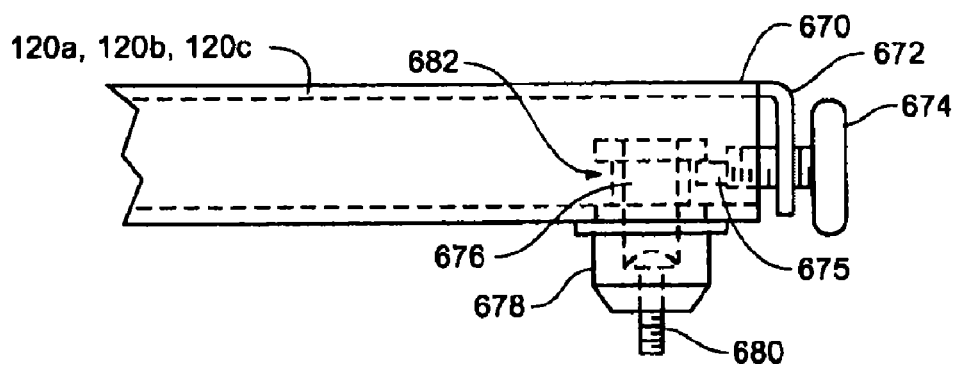
FIG. 35 is a side view of a rotating knob locking mechanism of a projector interface according to an embodiment of the invention in the locked position.

Referring to FIG. 35, projector interface 104 includes a track assembly 120a, 120b, 120c, having an end 670 with a coupling portion in the form of end plate 672, locking knob 674 with locking pin 675, and track bar fastener 676. Fastener 680 attaches a projector interface member in the form of engagement fastener 678 to projector 102. Track bar fastener 676 is threaded into engagement fastener 678. Alternatively, track bar fastener 676 is attached to engagement fastener 678 via fastener 680. The track bar fastener attached to engagement fastener 678 is inserted up into track bar 670 via an aperture or slot (not depicted) in track bar 670. Locking knob 674 is held in position by plate 672, and is rotated inward such that an end 675 of locking knob 674 fits into a mating groove 682 of fastener 676, thereby locking projector interface 104 to projector 102.

Figure 36A:
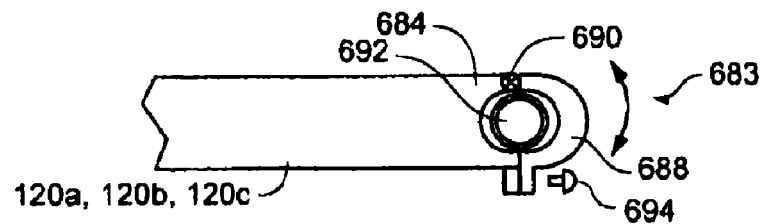
FIG. 36a is a top view of a pivoting latch mechanism of a projector interface according to an embodiment of the invention in a locked position.
Figure 36B:
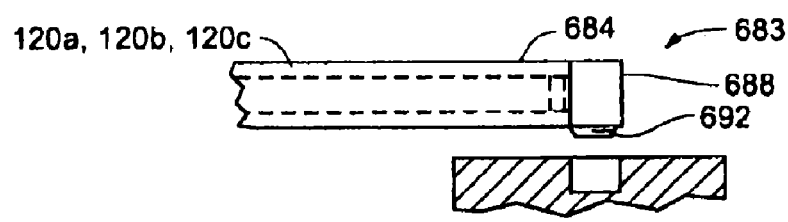

Referring to FIGS. 36a, 36b, track assembly 120a, 120b, 120c, of projector interface 104 is removably coupled to projector 102 via a coupling portion in the form of pivoting latch mechanism 683. Mechanism 683 generally includes a bar 684 with stop 686, pivoting mechanism 688, pivot point 690, a projector interface member in the form of engagement fastener 692, and pin 694. Engagement fastener 692 is generally attached to projector 102 in the engaged or attached position. Engagement mechanism 688 pivots about point 690, thus defining a large opening when pivoted away from bar 684 and a small opening when closed and adjacent to stop 686. In the closed, or engaged position, the mechanism fits over, or grips engagement fastener 692, thereby coupling projector 102 to interface 104. In the open, or disengaged position, bar 684 and the associated pivoting mechanism or latch may be pulled away from fastener 692, thereby disengaging projector 102.

Figure 37:
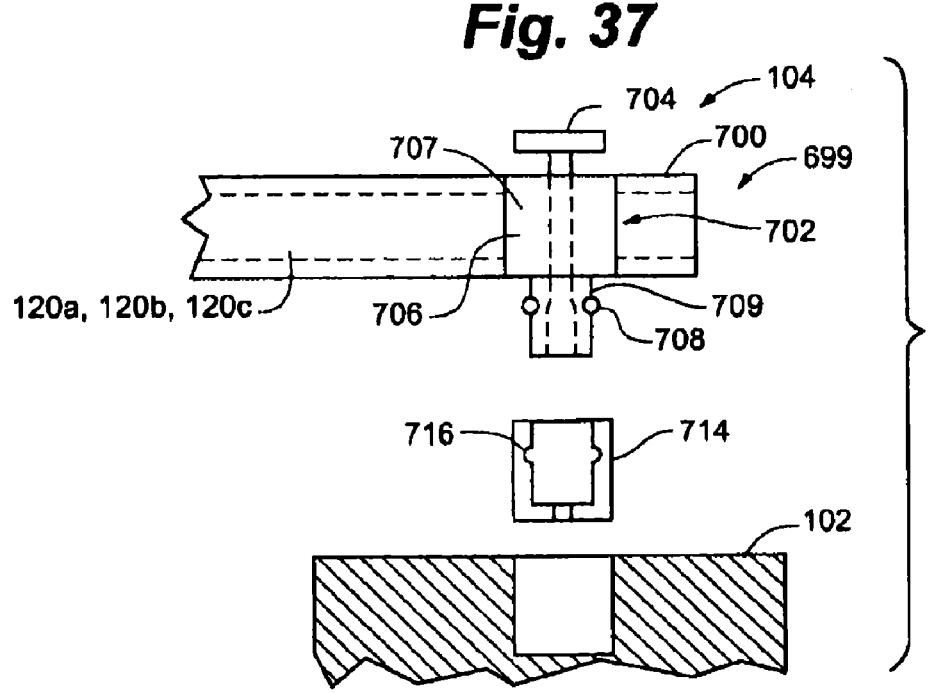
FIG. 37 is an exploded side view of a plunger latch mechanism of a projector interface according to an embodiment of the invention.

Referring to FIG. 37, a coupling portion in the form of plunger latch mechanism 699 may be used to removably couple a projector 102 to a projector interface 104. The depicted system generally includes a track assembly 120a, 120b, 120c, presenting end 700, plunger assembly 702 and projector 102. Plunger assembly 702 generally includes plunger 704, plunger sleeve 706, and a projector interface member in the form of receiving sleeve 714. Plunger sleeve 706 includes a large diameter upper portion 707 small diameter lower portion 709 and movable ball detents 708. Receiving sleeve 714 generally defines radial groove 716. Receiving sleeve 714 is set into projector 102 and adapted to receive lower portion 709 and detents 708. With lower portion 709 inserted into receiving sleeve 714 ball detents 708 move toward and into groove 716 when plunger 704 is raised, thereby locking projector interface 104 to projector 102. When plunger 704 is pushed in, or lowered, bar 700 may be pulled upward and away from projector 102.

Figure 38:
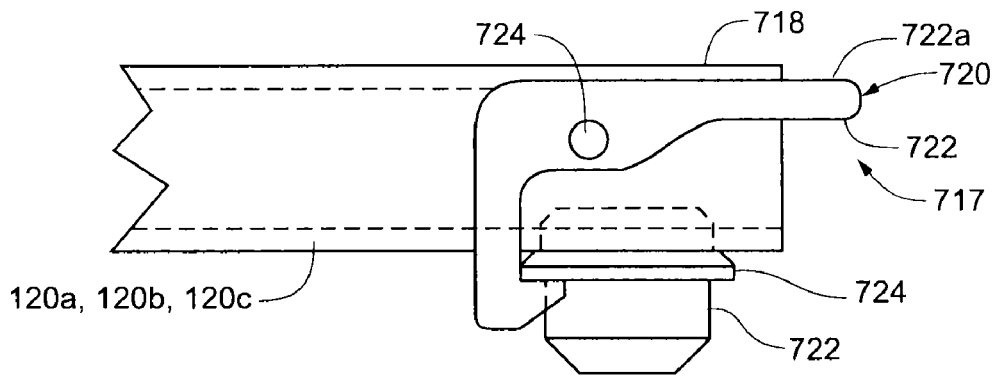
FIG. 38 is a side view of a hook latch mechanism of a projector interface according to an embodiment of the invention in a locked position.

Referring to FIG. 38, a coupling portion in the form of hook latch mechanism 717 may be used to removably connect projector interface 104 to projector 102. The depicted system includes track assembly 120a, 120b, 120c, of projector interface 104 presenting end 718, hook latch assembly 720, a projector interface member in the form of engagement fastener 722, and engagement collar 724. Engagement fastener 722 is attached to projector 102 with engagement collar 124 threaded over it. Latch hook assembly 720 includes a hook 722 and pivot pin 724. When a downward force is applied to end 722a of hook 722, hook 722 pivots about pin 724 and disengages collar 724 from end 718, thereby uncoupling projector 102 from projector interface 104.

Figure 39A:
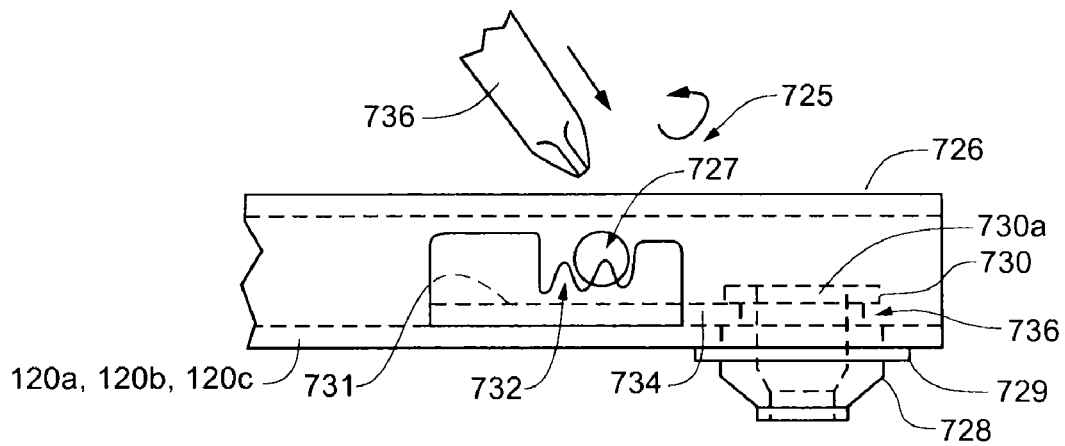
FIG. 39a is a side view of a tool-actuated latch mechanism of a projector interface according to an embodiment of the invention in an unlocked position.
Figure 39B:
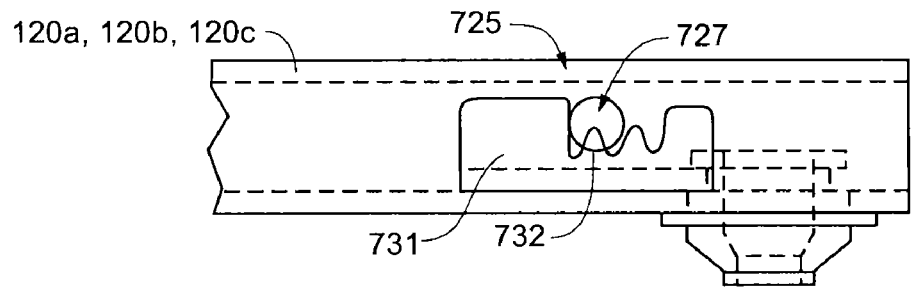
FIG. 39b is a side view of a tool-actuated latch mechanism of a projector interface according to an embodiment of the invention in a locked position.

Referring to FIGS. 39a-39b, a coupling portion in the form of tool-actuated latch mechanism 725 may be used to removably connect track assembly 120a, 120b, 120c, of projector interface 104 to projector 102. The system of the depicted embodiment includes track assembly 120a, 120b, 120c, presenting end 726, inside fastener 730, ridged slide bar 731, a projector interface member in the form of engagement fastener 728, engagement collar 729, and tool 736. Ridged slide bar 731 defines ridges 732 and retaining end 734. Engagement fastener 728 is coupled to projector 102 and receives threaded collar 729. Inside fastener 730 includes a head portion 730a and defines groove 736. Fastener 730 may be integral to, or separate from, engagement fastener 728, and is inserted into an interior space of track bar 120a, 120b, 120c. In the locked or engaged position, end 734 is located in groove 736 such that engagement fastener 728 and projector 102 are locked to track assembly 120a, 120b, 120c. Tool 736 is a Phillips screwdriver in one embodiment, but may be any other similarly functioning tool. Tool 736 is inserted into hole 727 and engages ridges 732 of slide 731. The rotation of tool 736 causes slide 731 to move toward or away from groove 736, thereby locking or unlocking projector 102.

Figure 40A:
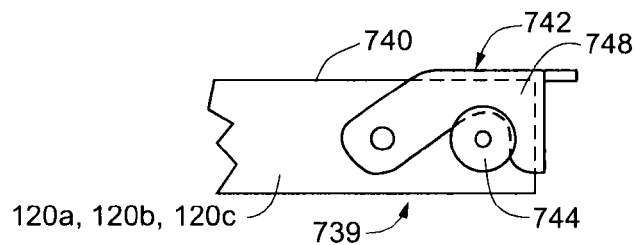
FIG. 40a is a top view of a top-pivoting latch mechanism of a projector interface according to an embodiment of the invention in a locked position.
Figure 40B:
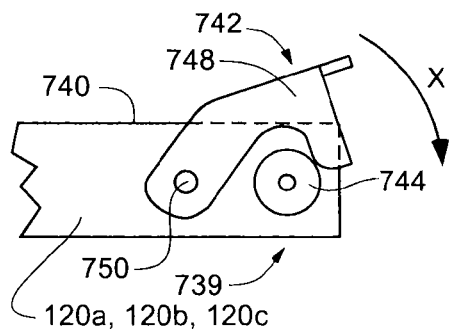
FIG. 40b is a top view of a top-pivoting latch mechanism of a projector interface according to an embodiment of the invention in an unlocked position.
Figure 40C:
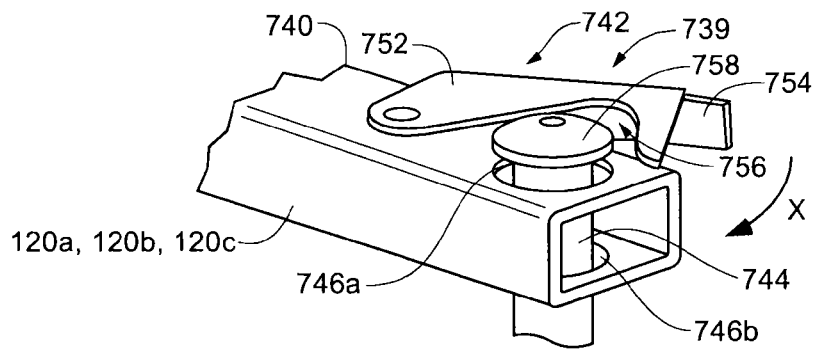
FIG. 40c is a perspective view of a top-pivoting latch mechanism of a projector interface according to an embodiment of the invention in an unlocked position.

Referring to FIGS. 40a-c, a coupling portion in the form of pivoting latch mechanism 739 may be used to removably connect projector interface 104 to projector 102. The system of the depicted embodiment generally includes track assembly 120a, 120b, 120c, presenting end 740, pivoting latch mechanism 742 and a projector interface in the form of post 744. End 740 defines a pair of openings 746a, 746b. Latch mechanism 742 includes latch 748 with top portion 752, side portion 754, and pivot pin 750. Latch 748 defines curved retention space 756. Post 744 includes a head 758 with a diameter larger than the diameter of the shaft of pin 744, and in the locked or connected position is inserted upward and through end 740. Latch 742 is pivoted about pin 750 so that top portion 752 contacts post 744. Curved retaining space 756 receives the shaft of post 744, while post head 758 remains above latch top portion 752, thereby locking projector 102 to end 740. To unlock projector 102 from end 740 of projector interface 104, latch 742 is pivoted away from end 740, disengaging latch 742 from post 744, allowing post 744 attached to projector 102 to be removed from end 740.

Figure 41:
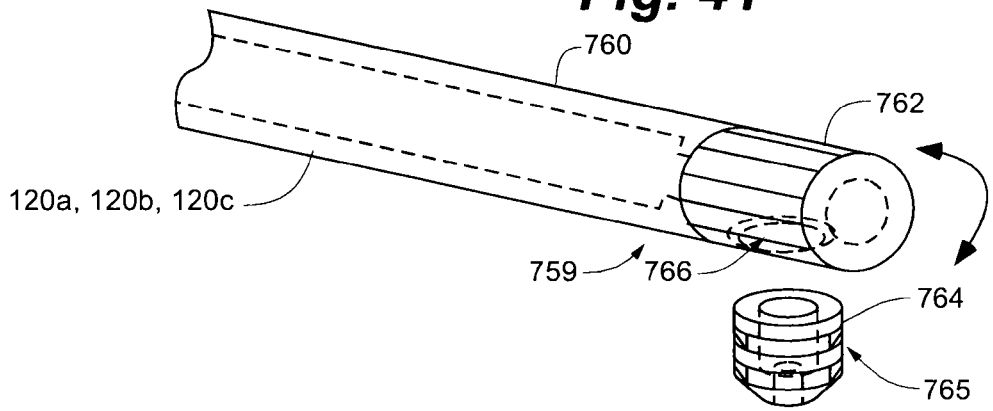
FIG. 41 is an exploded perspective view of a rotating latch mechanism of a projector interface according to an embodiment of the invention.
Figure 42:
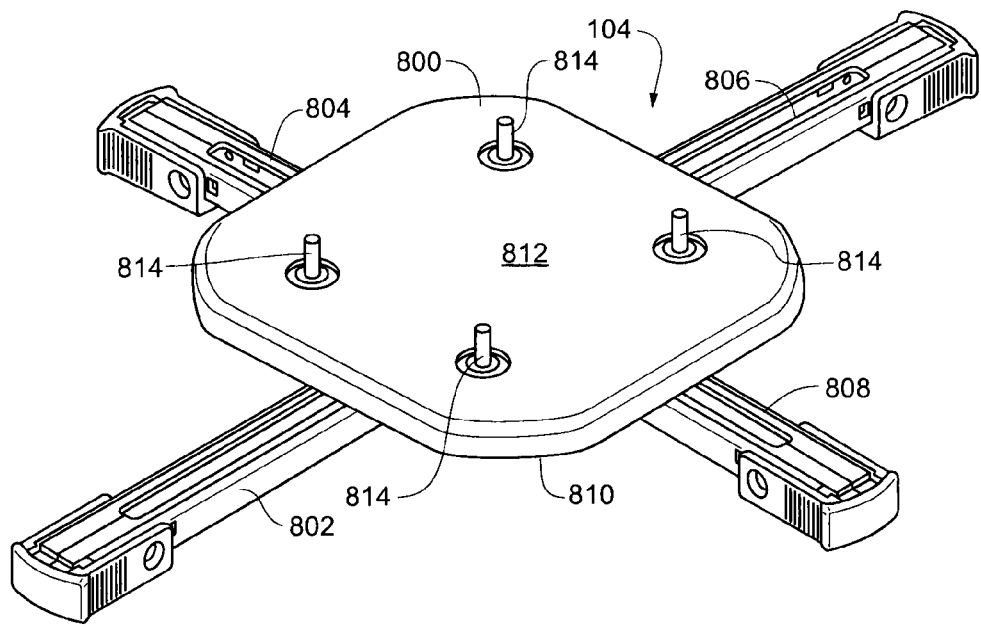
FIG. 42 is a perspective view of a universal projector interface according to an alternative embodiment of the invention.
Figure 43:
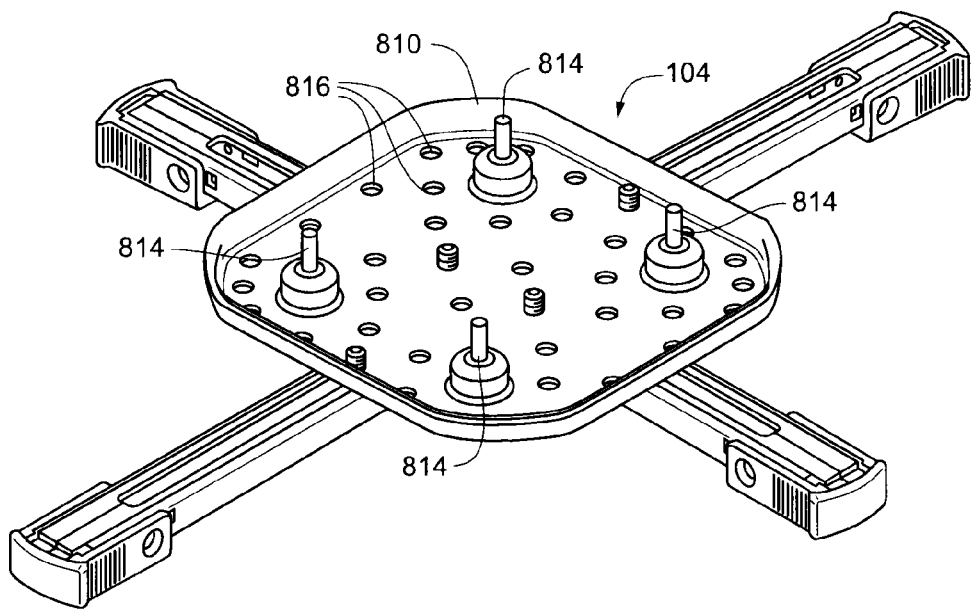
FIG. 43 is a perspective view of the interface of FIG. 42 with the cover portion removed.
Figure 44:
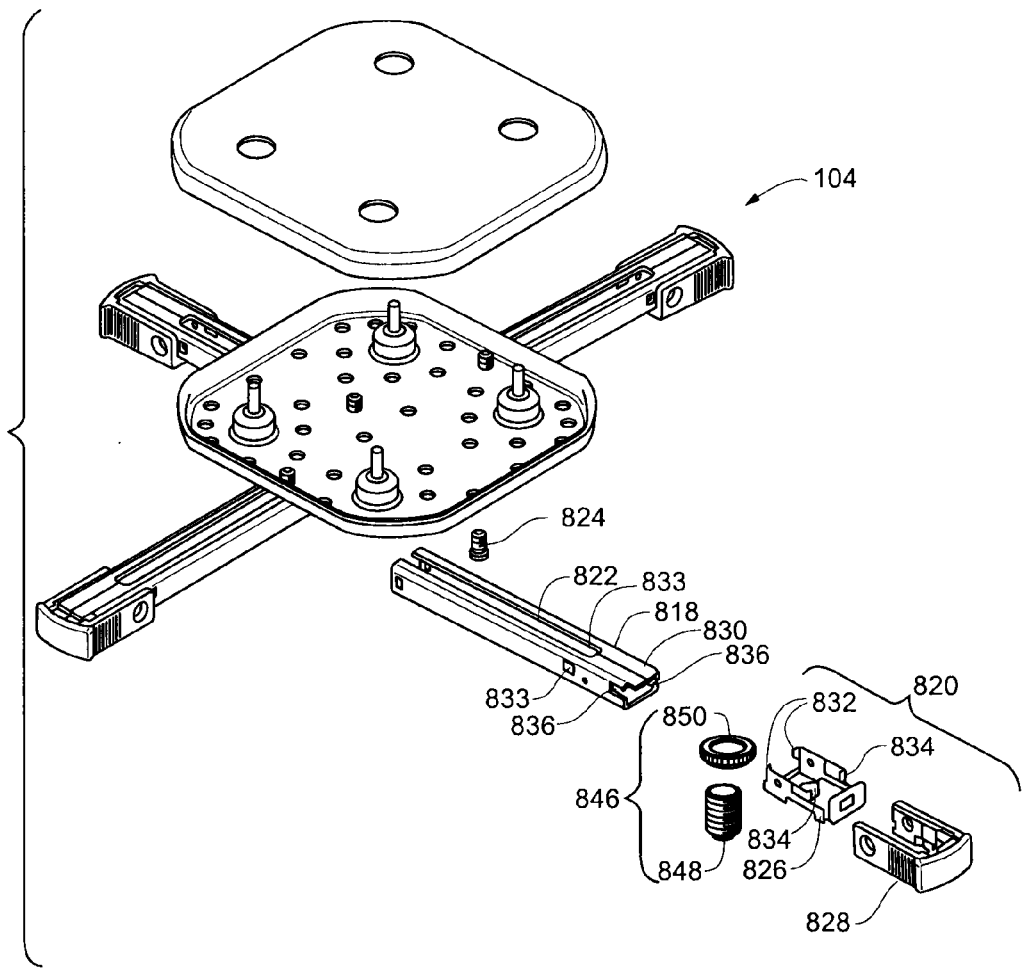
FIG. 44 is a partial exploded view of the interface of FIG. 42.

Referring to FIG. 41, a coupling portion in the form of rotating latch mechanism 759 may be used to removably connect projector interface 104 to projector 102. The system of the depicted embodiment generally includes track assembly 120a, 120b, 120c, of projector interface 104 presenting end 760, rotating mechanism 762, and a projector interface member in the form of grooved engagement fastener 764. End 760 may be cylindrical in shape so as to match the cylindrical shape of rotating mechanism 762. Rotating mechanism 762 is rotatably attached to end 760 and generally defines an orifice 766 sized to receive grooved engagement fastener 764, and one or more grooves 765. Grooved engagement fastener 764 is attached at a bottom end to projector 102, and is removably inserted through orifice 766 into rotating mechanism 762. Rotating 762 causes an edge portion of rotating mechanism 762 near orifice 766 to be inserted into a groove 765, thereby locking rotating mechanism 762 and bar 760 to grooved engagement fastener 764 and projector 102.

Another embodiment of a projector interface 104 according to an embodiment of the invention is depicted in FIGS. 42-49. In this embodiment, projector interface 104 generally includes interface assembly 800 and identical track assemblies 802, 804, 806, 808. Interface assembly 800 generally includes tray 810, cover 812, and attachment studs 814. Tray 810 defines a plurality of apertures 816.

Track assemblies 802, 804, 806, 808, generally include track bar 818 and coupling portion 820. Track bar 818 defines upwardly facing channel 822 which slidably receives fastener 824 for coupling the track bar to tray 810 through one of apertures 816. Coupling portion 820 generally includes slide clip 826 and grip portion 828. Slide clip 826 is received on end 830 of track bar 818 with tabs 832 received in apertures 833 and tabs 834 received in notches 836. Grip portion 828 is received on slide clip 826 to provide improved gripping purchase for the fingers of a user. Bottom side 838 of track bar 818 defines generally round aperture 840. Bottom side 842 of slide clip 826 defines oblong aperture 844. Oblong aperture 844 is generally registered with aperture 840 when slide clip 826 is received on track bar 818.

Projector interface member 846 generally includes threaded barrel 848 and collar 850, which is threaded onto barrel 848. Barrel 848 may be coupled to projector 102 with a fastener (not depicted) as described elsewhere in this application. Barrel 848 has a diameter smaller than that of aperture 840, and collar 850 has a diameter larger than that of aperture 840 but smaller than the least dimension of aperture 844.

Figure 45:
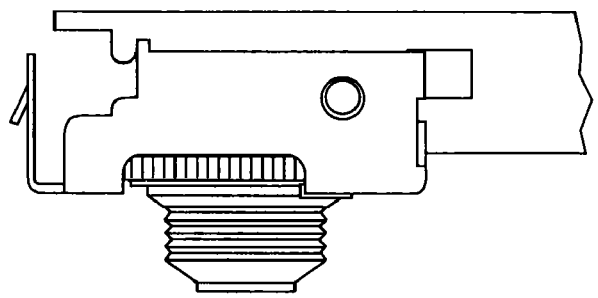
FIG. 45 is a side elevation view of a coupling portion and projector interface member of the interface of FIG. 42 with the coupling portion in an engaged position.
Figure 46:
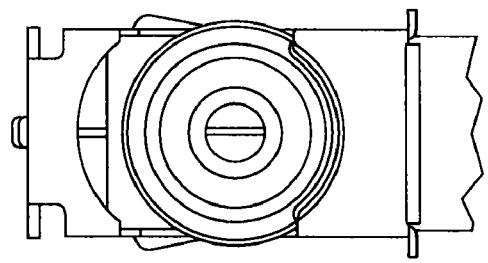
FIG. 46 is a top plan view of the coupling portion and projector interface member of FIG. 45.
Figure 47:
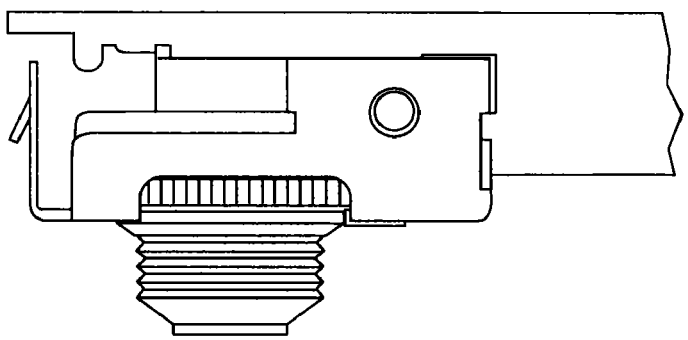
FIG. 47 is a side elevation view of a coupling portion and projector interface member of the interface of FIG. 42 with the coupling portion in a disengaged position.
Figure 48:
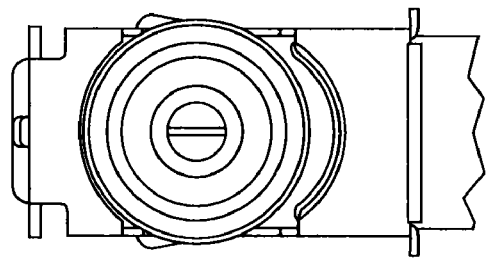
FIG. 48 is a top plan view of the coupling portion and projector interface member of FIG. 47.
Figure 49:
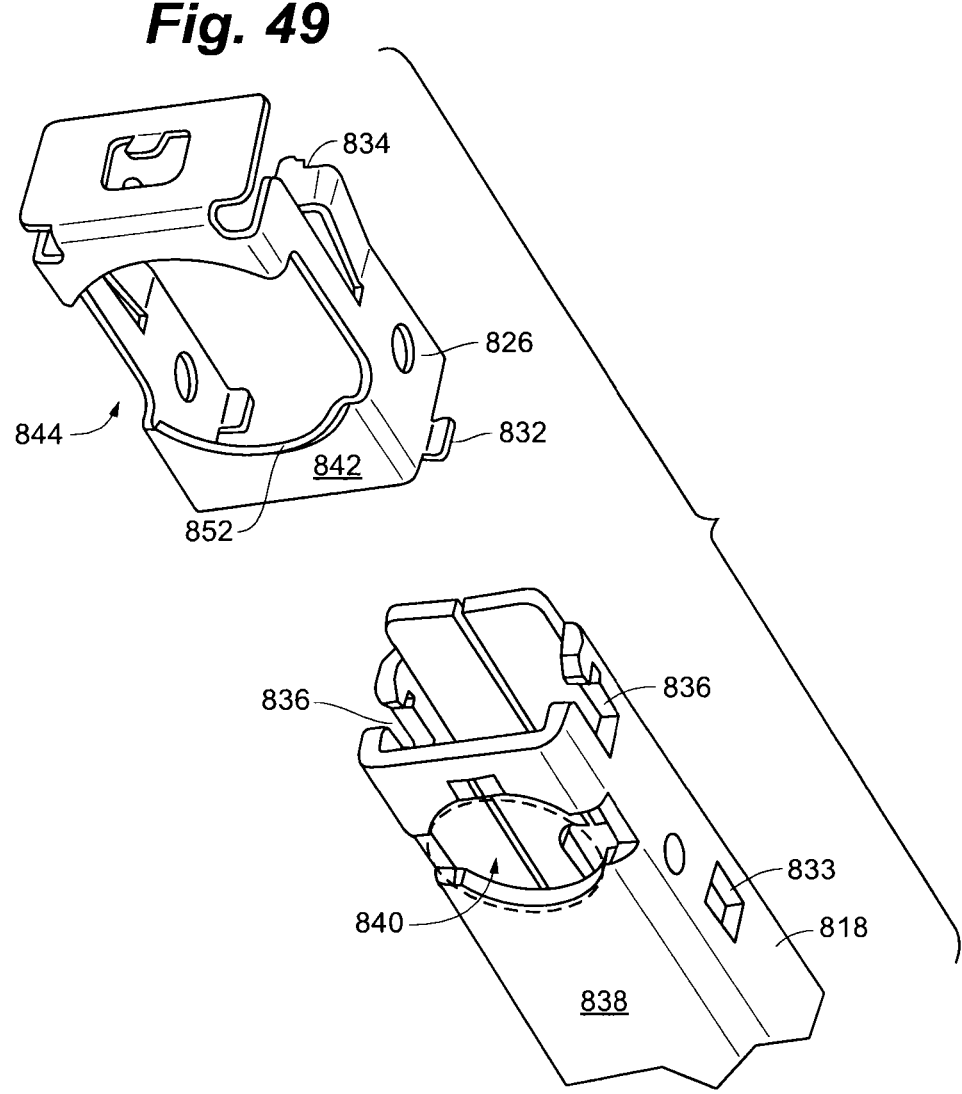
FIG. 49 is a partial exploded view of a coupling portion and track arm of the interface of FIG. 42.

As depicted in FIGS. 45-48, track assemblies 802, 804, 806, 808, may be coupled to a projector interface member 846 and an attached projector by shifting slide clip 826. As depicted in FIGS. 47 and 48, with slide clip 826 pushed onto track bar 818 to the limit of its travel as defined by the interface of tabs 832 in apertures 833 and tabs 834 in notches 836, apertures 840 and 844 are registered. The top of barrel 848 is received through aperture 840 with collar 850 abutting bottom side 838 of track arm 818. With projector interface member 846 received in this fashion, slide clip 826 can be pulled outward as depicted in FIGS. 45 and 46. Rear edge 852 of aperture 844 is received under collar 850, while the top surface of collar 850 is urged against bottom side 838 of track arm 818. Each track assembly 802, 804, 806, 808, is thereby quickly and easily secured to a projector interface member 846 on projector 102. The track assemblies can also be quickly disengaged for projector removal or service simply by pushing the slide clips onto the track arms such that the projector interface member is released.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A universal projector interface comprising:
a mount interface portion adapted to receive a projector mount;
at least one projector attachment member adapted to couple with a projector; and
at least one arm assembly operably coupled with the mount interface portion so as to be selectively shiftable relative to the mount interface portion, the arm assembly including an elongate arm member and a coupling portion selectively shiftable relative to the arm member, the coupling portion shiftable between a first position wherein the coupling portion is engaged with the at least one projector attachment member so as to prevent vertical and horizontal translation of the at least one arm assembly relative to the at least one projector attachment member, and a second position wherein the coupling portion and the at least one arm assembly is freely disengagable from the at least one projector attachment member.

2. The universal projector interface of claim 1, wherein the projector attachment member comprises a fastener receivable in a fastener aperture of the projector and a selectively shiftable collar on the fastener.

3. The universal projector interface of claim 1, wherein the coupling portion comprises a clip slidably received on an end of the at least one arm assembly.

4. The universal projector interface of claim 1, wherein the projector attachment member comprises a fastener receivable in a fastener aperture of the projector and a collar threaded on the fastener, wherein the coupling portion comprises a clip slidably received on an end of the at least one arm assembly.

5. The universal projector interface of claim 4, wherein the clip defines a projection, the projection being engaged with the collar of the projector attachment member when the coupling portion is in the first position so as to inhibit threading movement of the collar on the fastener.

6. The universal projector interface of claim 1, wherein the mount interface portion defines a plurality of elongate apertures, and wherein the at least one arm assembly is coupled to the mount interface portion with a fastener extending through one of the elongate apertures, the fastener selectively shiftable along the elongate aperture to shift a position of the at least one arm assembly relative to the mount interface portion.

7. The universal projector interface of claim 6, wherein the at least one arm assembly includes an elongate arm member defining a channel oriented longitudinally along the elongate arm member, the fastener being selectively shiftable along the channel to enable shifting of the position of the at least one arm assembly relative to the mount interface portion.

8. The universal projector interface of claim 1, further comprising means for locking the coupling portion in the first position.

9. The universal projector interface of claim 8, wherein the at least one arm assembly defines a first aperture and the coupling portion defines a second aperture, the first and second apertures being in registration when the coupling portion is in the first position, and wherein the means for locking comprises a locking member insertable through the first aperture and the second aperture when the coupling portion is in the first position.

10. A visual display system comprising:
a projector;
a projector mount; and
a universal mount interface operably coupling the projector and the projector mount, universal mount interface comprising:
a mount interface portion operably coupled with the projector mount;
at least one projector attachment member coupled with the projector; and
at least one arm assembly operably coupled with the mount interface portion so as to be selectively shiftable relative to the mount interface portion, the arm assembly including an elongate arm member and a coupling portion selectively shiftable relative to the arm member, the coupling portion shiftable between a first position wherein the coupling portion is engaged with the at least one projector attachment member so as to prevent vertical and horizontal translation of the at least one arm assembly relative to the at least one projector attachment member, and a second position wherein the coupling portion and the at least one arm assembly is freely disengagable from the at least one projector attachment member.

11. The visual display system of claim 10, wherein the projector attachment member comprises a fastener receivable in a fastener aperture of the projector and a selectively shiftable collar on the fastener.

12. The visual display system of claim 10, wherein the projector attachment member comprises a fastener receivable in a fastener aperture of the projector and a collar threaded on the fastener, wherein the coupling portion comprises a clip slidably received on an end of the at least one arm assembly.

13. The visual display system of claim 12, wherein the clip defines a projection, the projection being engaged with the collar of the projector attachment member when the coupling portion is in the first position so as to inhibit threading movement of the collar on the fastener.

14. The visual display system of claim 10, wherein the mount interface portion defines a plurality of elongate apertures, and wherein the at least one arm assembly is coupled to the mount interface portion with a fastener extending through one of the elongate apertures, the fastener selectively shiftable along the elongate aperture to shift a position of the at least one arm assembly relative to the mount interface portion.

15. The visual display system of claim 14, wherein the at least one arm assembly includes an elongate arm member defining a channel oriented longitudinally along the elongate arm member, the fastener being selectively shiftable along the channel to enable shifting of the position of the at least one arm assembly relative to the mount interface portion.

16. A method of installing a projector comprising:
providing a universal projector interface with a mount interface portion adapted to receive a projector mount thereon, at least one projector attachment member adapted to couple with a projector, and at least one arm assembly operably coupled with the mount interface portion so as to be selectively shiftable relative to the mount interface portion, the arm assembly including an elongate arm member and a coupling portion selectively shiftable relative to the arm member, the coupling portion shiftable between a first position wherein the coupling portion is engaged with the at least one projector attachment member so as to prevent vertical and horizontal translation of the at least one arm assembly relative to the at least one projector attachment member, and a second position wherein the coupling portion and the at least one arm assembly is freely disengagable from the at least one projector attachment member; and
providing instructions with the universal projector interface instructing a user to couple the at least one projector attachment member with the projector, couple the mount interface portion with the projector mount, and couple the projector with the projector mount by shifting the coupling portion of the arm assembly to the second position, engaging the coupling portion with the projector attachment member, and shifting the coupling portion to the first position.

17. A visual display system comprising:
a projector;
a projector mount; and
a universal mount interface operably coupling the projector and the projector mount, universal mount interface comprising:
a mount interface portion operably coupled with the projector mount;
a plurality of projector attachment members coupled with the projector; and
a plurality of arm assemblies operably coupled with the mount interface portion so as to be selectively shiftable relative to the mount interface portion, each arm assembly including an elongate arm member and a coupling portion selectively shiftable relative to the arm member, the coupling portion shiftable between a first position wherein the coupling portion is engaged with one of the projector attachment members so as to prevent vertical and horizontal translation of the arm assembly relative to the projector attachment member to which the arm assembly is attached, and a second position wherein the coupling portion and the arm assembly are freely disengagable from the projector attachment member.

18. The visual display system of claim 17, wherein each projector attachment member comprises a fastener receivable in a fastener aperture of the projector and a selectively shiftable collar on the fastener.

19. The visual display system of claim 17, wherein each projector attachment member comprises a fastener receivable in a fastener aperture of the projector and a collar threaded on the fastener, and wherein each coupling portion comprises a clip slidably received on an end of the arm assembly.

20. The visual display system of claim 17, wherein the mount interface portion defines a plurality of elongate apertures, and wherein each arm assembly is coupled to the mount interface portion with a fastener extending through a separate one of the elongate apertures, the fastener selectively shiftable along the elongate aperture to shift a position of the arm assembly relative to the mount interface portion.

21. The visual display system of claim 20, wherein each arm assembly includes an elongate arm member defining a channel oriented longitudinally along the elongate arm member, the fastener being selectively shiftable along the channel to enable shifting of the position of the arm assembly relative to the mount interface portion.

* * * * *